United States Patent [19]

Hirai et al.

[11] 4,228,791

[45] Oct. 21, 1980

[54] SOLAR ENERGY COLLECTING ROOF

[75] Inventors: Takashi Hirai; Tadahiro Hino, both of Tokyo, Japan

[73] Assignees: Showa Aluminium K.K., Osaka; Kabushiki Kaisha Hirai Giken, Tokyo, both of Japan

[21] Appl. No.: 921,238

[22] Filed: Jul. 3, 1978

[30] Foreign Application Priority Data

Jul. 6, 1977 [JP] Japan .................................. 52-80596
Nov. 24, 1977 [JP] Japan .............................. 52-139904

[51] Int. Cl.³ .................................................. F24J 3/02
[52] U.S. Cl. ................................... 126/450; 126/448; 126/DIG. 2; 52/460
[58] Field of Search ............... 126/270, 271, 450, 448; 237/1 A; 52/395, 466, 468, 460; 165/48, 49, 67

[56] References Cited

U.S. PATENT DOCUMENTS

| | | | |
|---|---|---|---|
| 3,937,208 | 2/1976 | Katz et al. | 237/1 A |
| 3,980,071 | 9/1976 | Barber, Jr. | 237/1 A |
| 4,114,595 | 9/1978 | Barker | 126/270 |
| 4,131,111 | 12/1978 | Hopper | 126/270 |

*Primary Examiner*—James C. Yeung

[57] ABSTRACT

A solar energy collecting roof having metal roof units capable of heat insulation and joint members joining the metal roof units includes cover glass frames successively inserted between each adjacent pair of joint members from the eaves side to the ridge side to fit in the adjacent joint members, each cover glass frame being formed of frame members having specific sectional shapes and at least one sheet of glass framed thereby.

9 Claims, 62 Drawing Figures

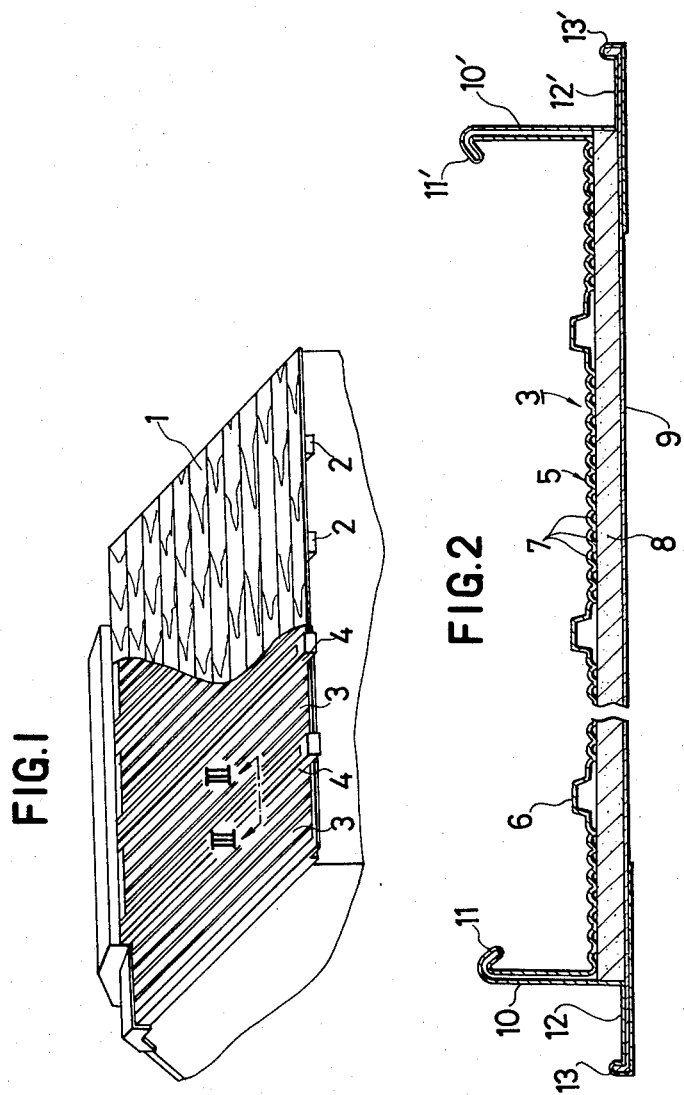

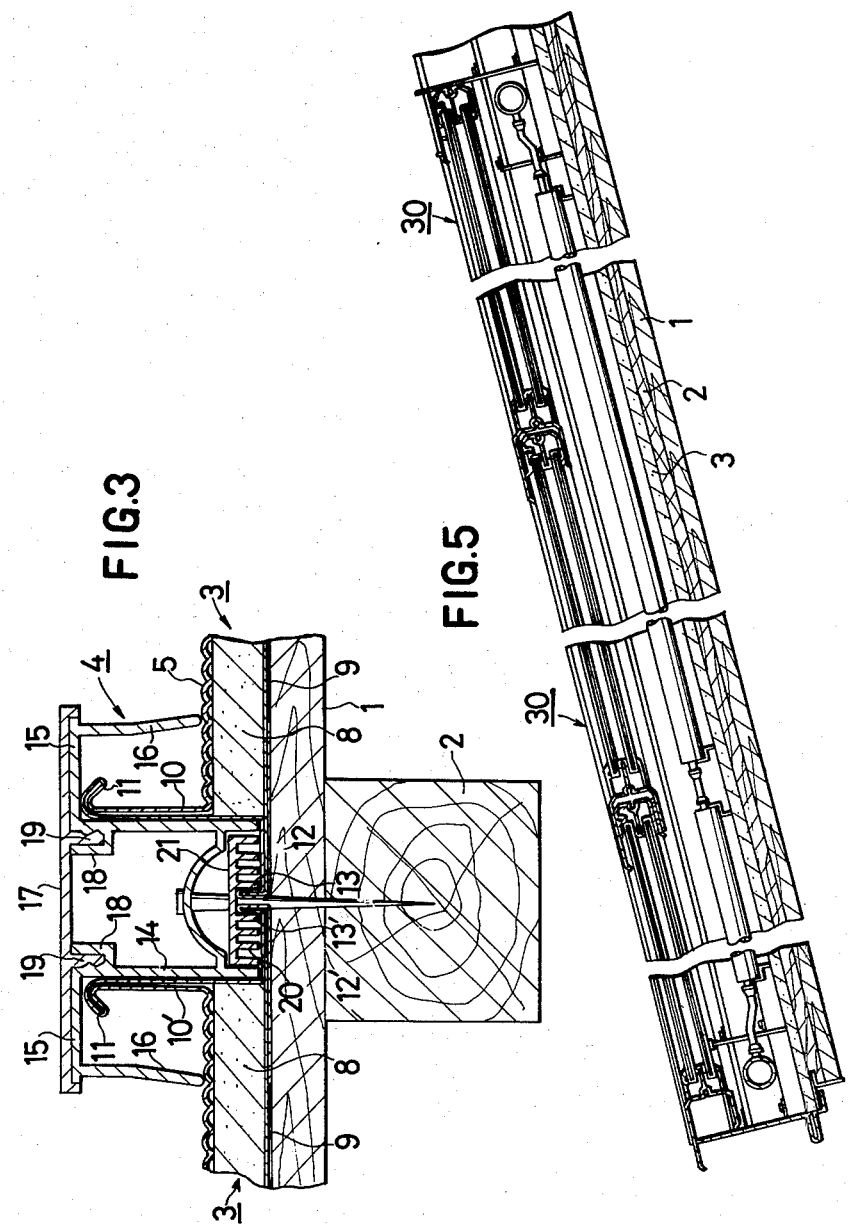

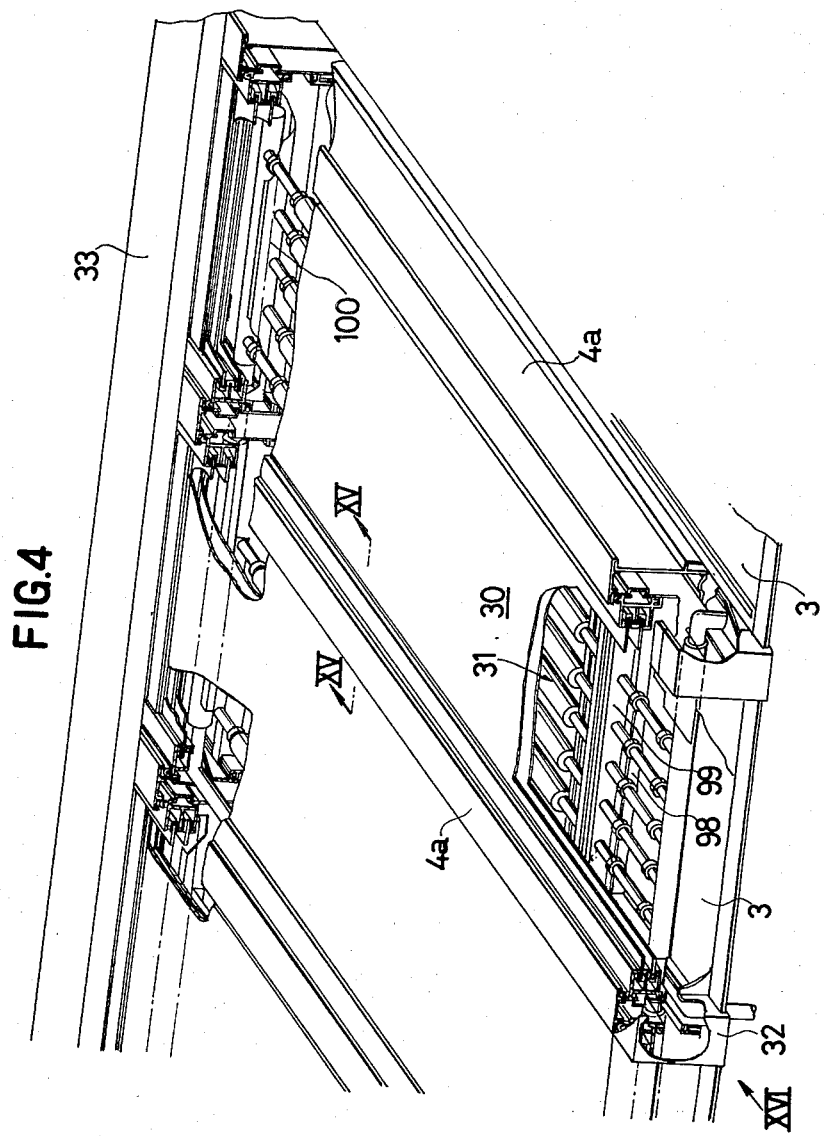

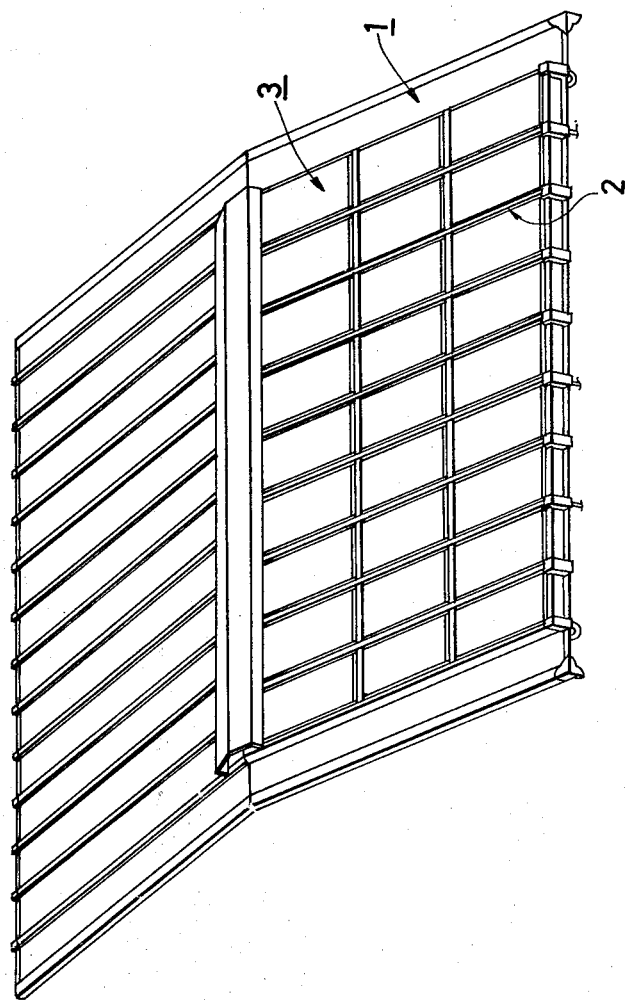

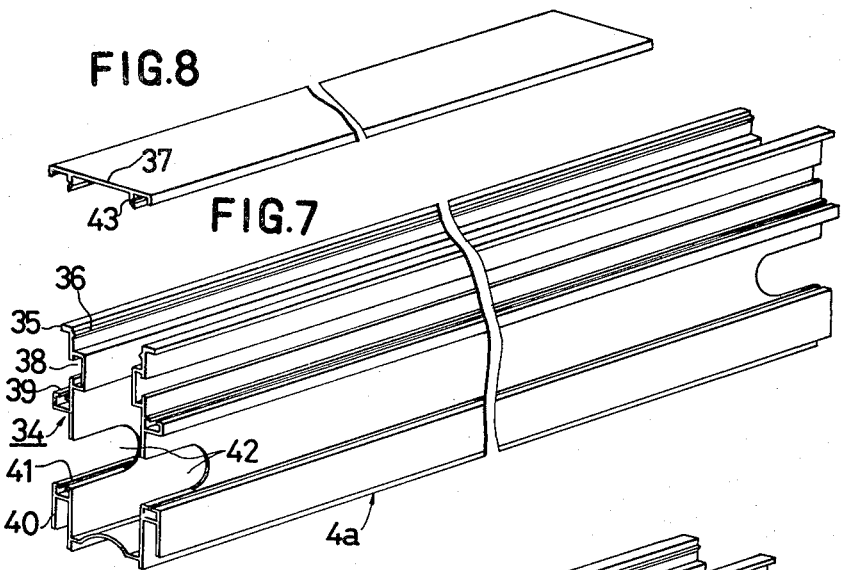

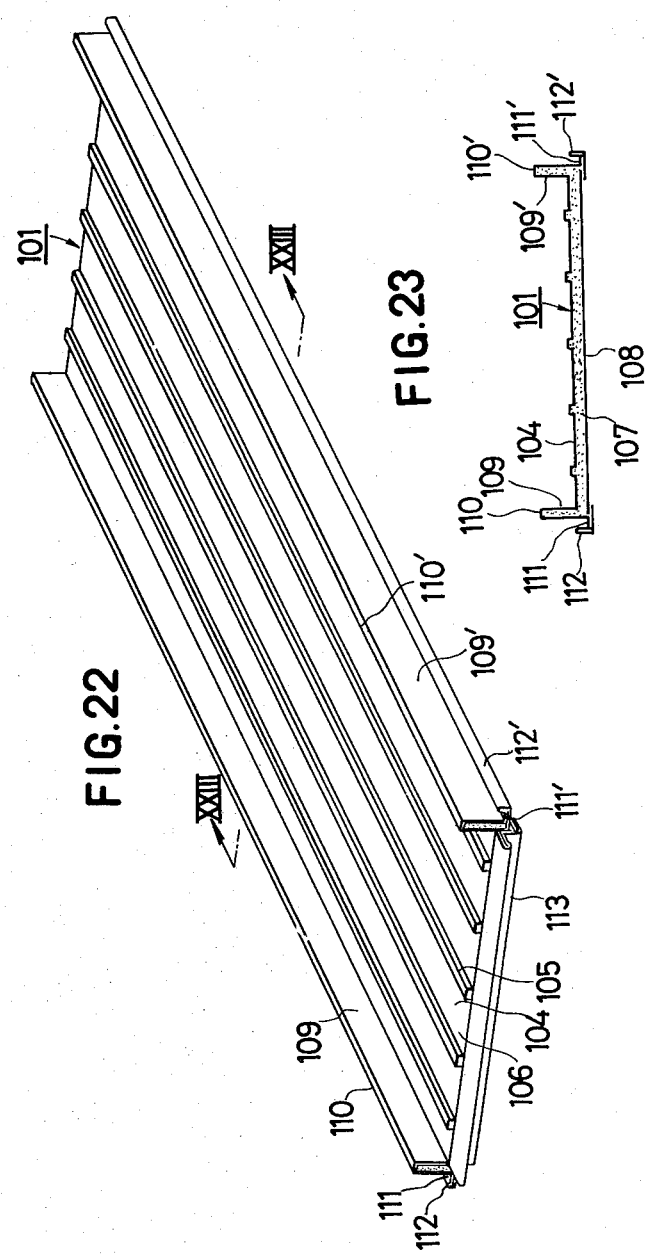

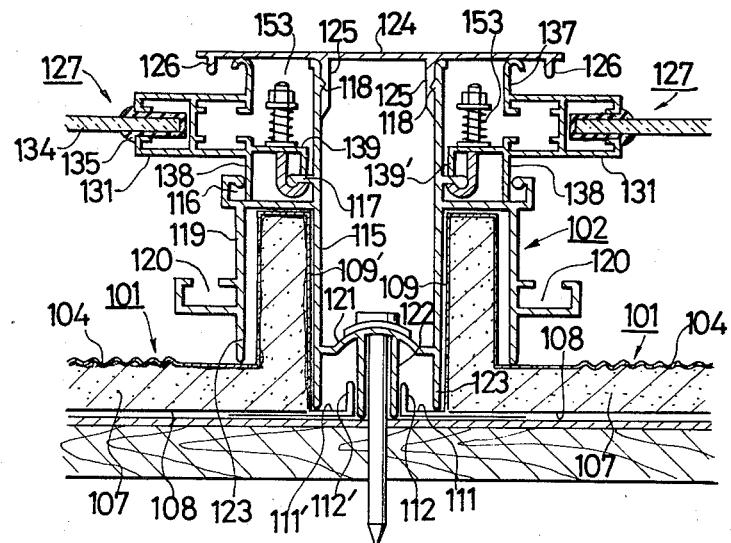
FIG. 24
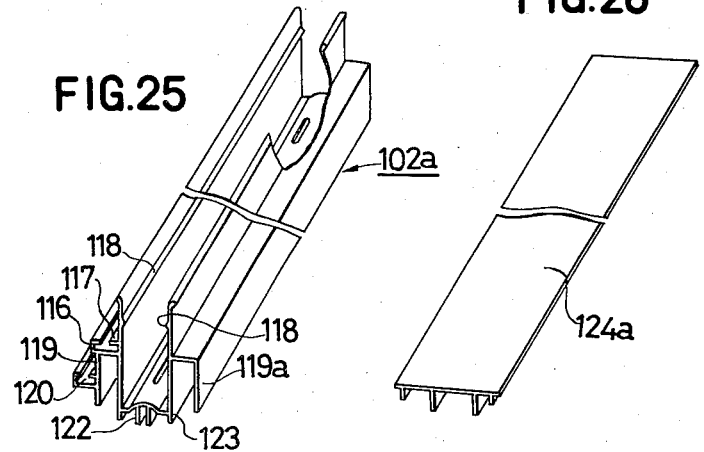
FIG. 25
FIG. 26

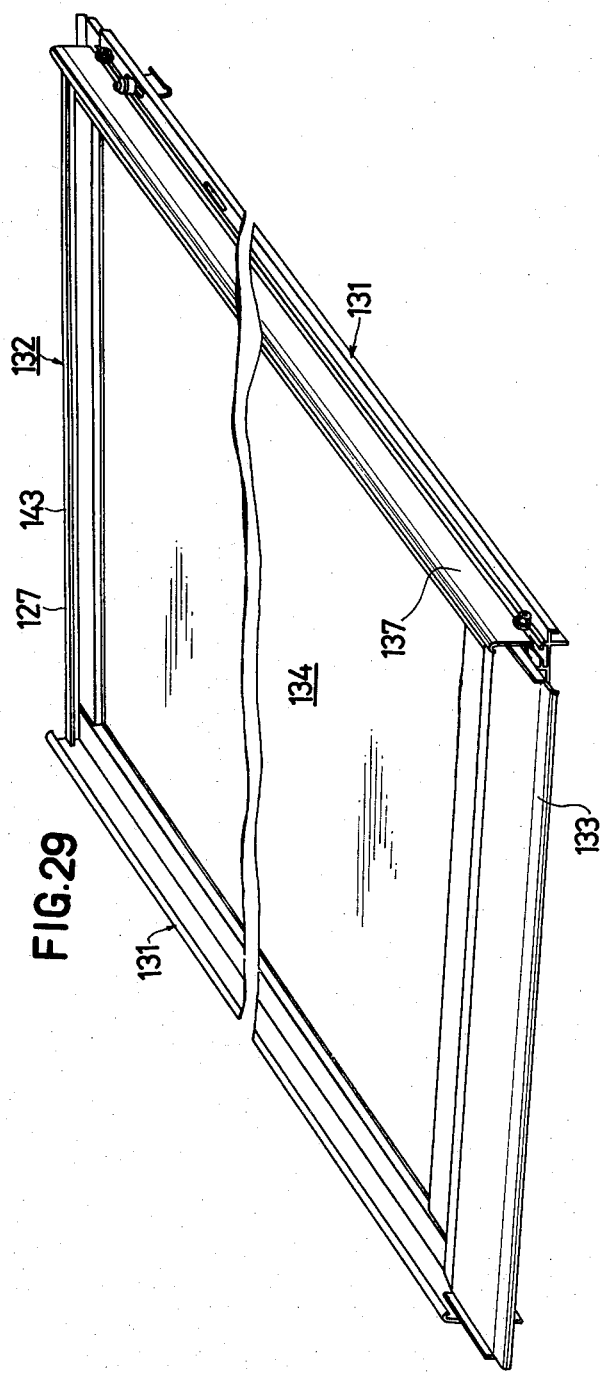

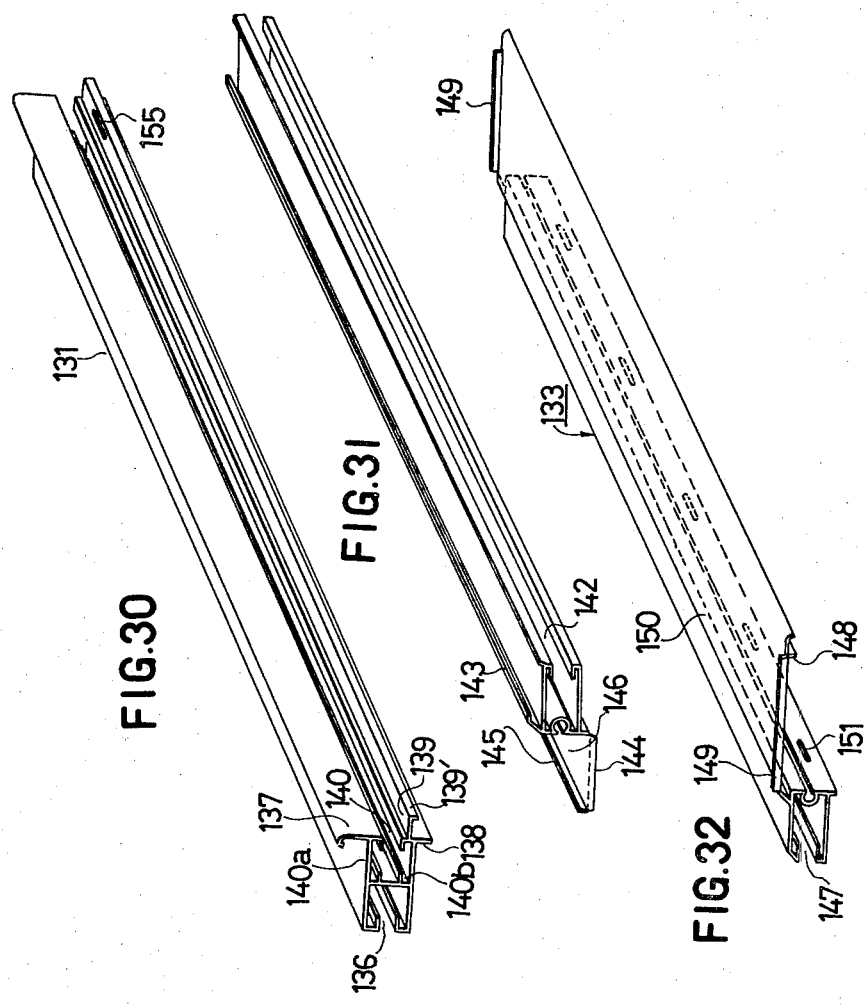

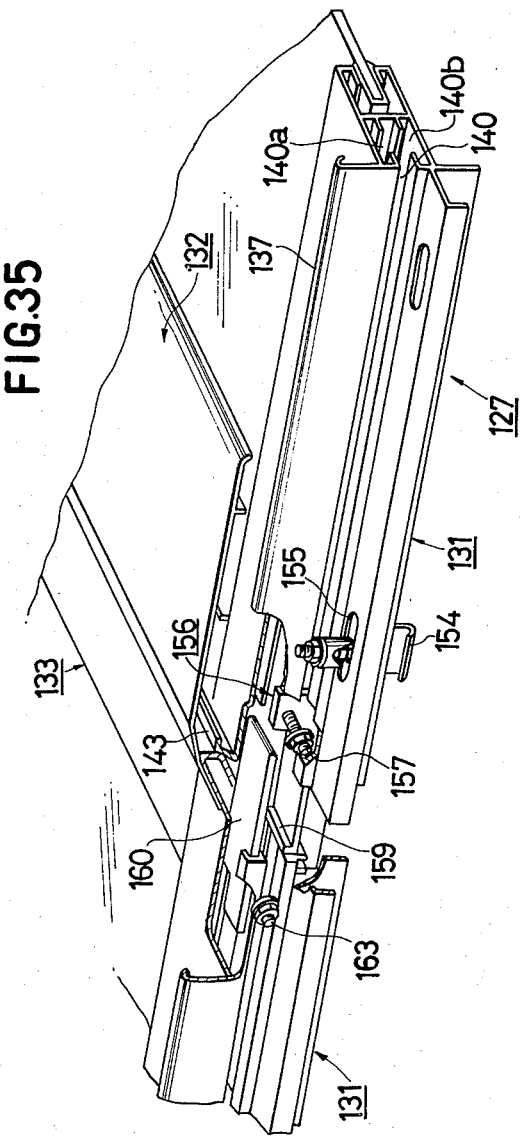
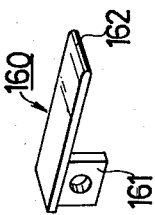
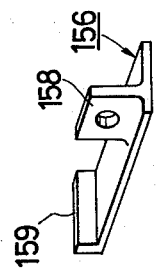

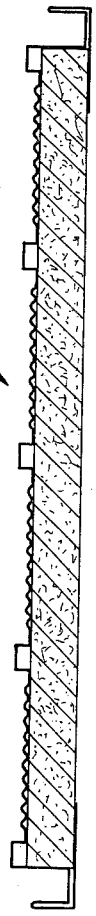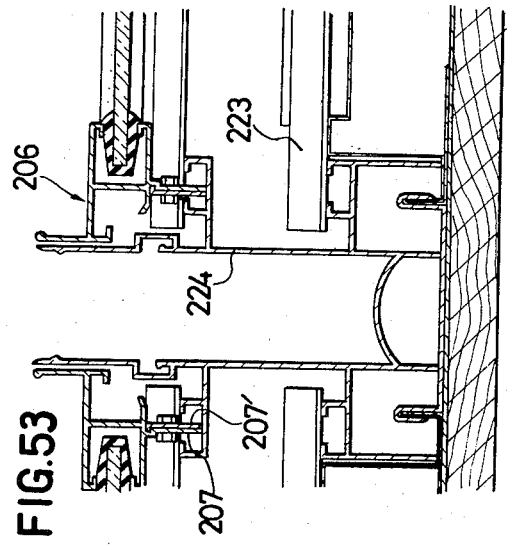
FIG.43
FIG.53

FIG.46
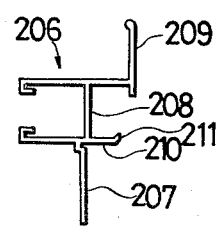
FIG.47
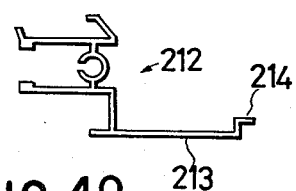
FIG.48
FIG.49
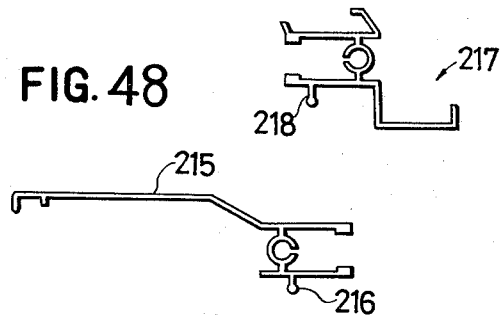
FIG.50
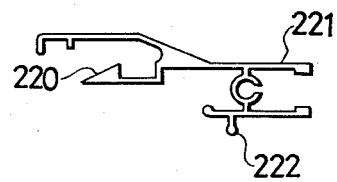

SOLAR ENERGY COLLECTING ROOF

FIELD OF THE INVENTION

This invention relates to a novel solar energy collecting roof, and more particularly to a solar energy collecting roof (hereinafter often simply referred to as "a solar roof") which comprises novel cover glass frames having metallic frame components and an improved metal roof construction in combination therewith.

BACKGROUND OF INVENTION

In the past, the present applicant applied for a patent on an invention concerning metal roof units incorporating a heat insulating material, joint members for connecting the rood units and related construction, and later filed a patent application for a collector provided by improving said joint members so as to allow cover glass frames to be fitted between adjacent novel joint members in the respective upper portions thereof to partition off a space in box form, in which piping for heat collection can be provided.

SUMMARY OF THE INVENTION

In connection with metal roofs associated with these earlier inventions, the present invention contemplates improvements in the earlier joint members and in the prior cover glass frame construction with respect to mounting, flashing, etc. with a view to provide a solar energy collecting roof characterized in that improved cover glass frames are inserted between adjacent improved joint members so as to fit in the upper portions thereof, thus boxing off a space to allow disposition of heat collecting pipes under the cover glass frames, so that the novel solar roof can be constructed integrally with the metal roof and is excellent in outward appearance.

Therefore it is an object of the invention to provide a solar roof capable of functioning as a structural element of the roof.

Another object of the invention is to provide a solar roof having novel structure which can compensate for the drawback caused by heat expansion in the aluminum material of long length that is used in the roof structure.

A further object of the invention is to provide a solar roof wherein rain water and moisture condensed therein are allowed to flow out through passages formed therein.

A further object of the invention is to provide a solar roof wherein only the broken glass proper can be replaced easily in the event of a cover-glass failure.

A further object of the present invention is to provide a solar roof wherein an excellent outward appearance can be obtained by concealing the fasteners such as screws, bolts, nails and the like from sight, and by confining piping therewithin.

A further object of the invention is to provide a solar roof which requires minimum fabricating work for roofing by adapting a knock-down system at the field site and which makes it easy to carry out roofing work without relying upon skills of other specialists other than carpenters and roofers.

The improved construction of the present invention eliminates conventional complicated and time-consuming work for connecting cover glass frames to joint members fastened to a roof structure, and allows most of the construction work to be done from above with enhanced efficiency. The improved construction also allows moisture condensed therein to flow out through passages formed in the downwardly sloping joint members, and further provides for unhindered thermal deformation due to the repetition of direct exposure to the sun and heat radiation. Thus, a sun heat collector of extremely high efficiency can be provided.

BRIEF DESCRIPTION OF THE DRAWINGS

FIG. 1 is a perspective view, partly broken away, of a roof laid by use of metal roof units.

FIG. 2 is a sectional view of a metal roof unit.

FIG. 3 is a sectional view taken along the line III—III of FIG. 1.

FIG. 4 is a perspective view, partly broken away, showing a collector attached to a roof.

FIG. 5 is a sectional view taken along the line V—V of FIG. 4.

FIG. 6 is a perspective view of a metal roof equipped with a collector embodying the present invention.

FIG. 7 is a perspective view of a joint member.

FIG. 8 is a perspective view of a cover.

FIG. 9 is a perspective view of a joint member for use at the end of a collector on one side thereof.

FIG. 22 is a perspective view of a metal roof unit to be laid under a collector.

FIG. 23 is a sectional view takes along the line XXIII—XXIII of FIG. 22.

FIG. 24 is an assembly drawing in cross section illustrating a second embodiment of the invention (with collector piping removed).

FIG. 25 shows a joint member for use at the end of a collector on one side thereof.

FIG. 26 shows a cover to the joint member shown in FIG. 25.

FIG. 29 is a perspective view of a cover glass frame.

FIG. 30 is a perspective view of a longitudinal rail.

FIG. 31 is a perspective view of an upper rail.

FIG. 32 is a perspective view of a lower rail.

FIG. 35 is a fragmentary perspective view showing cover glass frames joined together.

FIG. 36 is a perspective view of an adjuster.

FIG. 37 is a perspective view of a jig.

FIG. 43 is a sectional view of a metal roof unit taken along the line XXXXIII—XXXXIII of FIG. 38.

FIGS. 46 through 50 are sectional views of frame members, which are a longitudinal rail, an intermediate zone upper rail, an intermediate zone lower rail, a ridge side upper rail, and an eaves side lower rail respectively.

FIG. 53 shows how to fit longitudinal rails to a joint member.

DETAILED DESCRIPTION OF THE INVENTION

Figure 10:
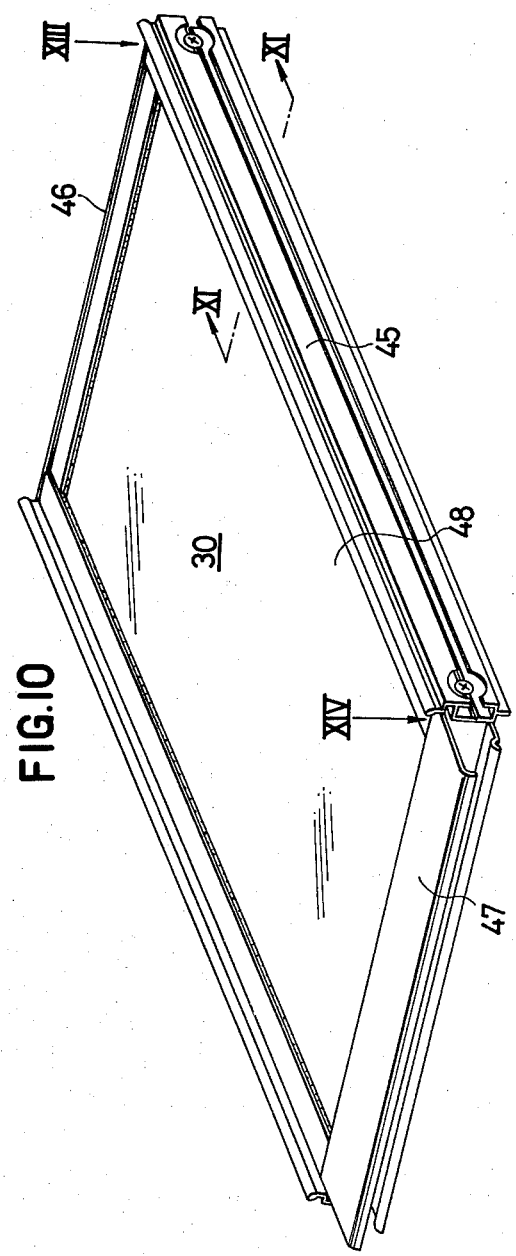
FIG. 10 is a perspective view of a cover glass frame.

The present invention is based on a metal roof construction, which will be outlined below prior to proceeding to a detailed description of a solar energy collecting roof in accordance with the invention.

FIGS. 1 through 3 show an example of a known roof. Referring to FIG. 1, roof boards 1 are generally laid on rafters 2, and metal roof units 3 are joined to each other by joint members 4.

Each metal roof unit 3, as shown in cross section in FIG. 2, has a surface metal plate 5 (preferably an aluminum alloy plate) which includes longitudinally extending raised portions 6 and small corrugations 7 between the raised portions. Beneath the metal plate 5 there is a heat insulating material 8 (glass wool, foam resin or the like) sandwiched between the metal plate 5 and a backing material 9 (such as a roofing material) which forms the bottom of the metal roof unit 3.

On one side of the surface metal plate 5, the plate is bent so as to form a vertical rising portion 10 having a bent top portion 11 (which may be eliminated) and a sideward connecting extension 12 having a short rising portion 13 at the outside edge thereof. The vertical rising portion 10 has an outside portion extending downwardly from the bent portion 11 and terminates in an upper flat portion of the connecting extension 12, forming a right angle therewith. The extension 12 also has a lower flat portion extending inwardly from the short rising portion 13. On the opposite side of the metal plate 5, it is bent in a similar manner to form a vertical rising portion 10' having a bent top portion 11' and a connecting extension 12' having a short rising portion 13'. Opposite side edge portions of the backing material 9 are respectively sandwiched between the upper and lower flat portions of the connecting extension 12 and between those of the extension 12'.

FIG. 3 is a sectional view taken along the line III—III of FIG. 1, showing adjacent metal roof units 3 coupled by a joint member 4. The joint structure 4 comprises a generally U-shaped main body 14, flanges 15 extending sideways from the main body 14 at the top thereof, and downward pieces 16 extending downwardly from the flanges 15 just inwardly of their outer edges, and a cover 17. The main body 14 has projecting pieces 18 formed inside its side walls and extending upwardly to cooperate therewith to lock legs 19 of the cover 17.

In roofing work, the connecting extensions 12 and 12' of two neighboring metal roof units 3 are positioned just above a rafter 2 and adjusted in position by using a plurality of retainers 21 each having an array of spaced pieces 20. Then, nails (not shown) are hammered in for positioning. Thereafter, the main body 14 of a joint member 4 is mounted and nails 22 are driven in to secure the joint member 4 to the rafter 2. After the main body 14 is thus fastened, the cover 17 is mounted from above. This completes the joining of the two roof units. In this way, metal roof units 3 are successively joined to construct such a roof as shown in FIG. 1.

Referring now to FIG. 4, there is shown a collector attached to joint members 4a provided by improving those of the roof constructed as described above. More particularly, the joint member 4a, which is an improvement on the joint member 4 shown in FIG. 3 and is formed to be higher than the latter, is mounted on metal roof units 3 to fix them to a rafter 2. Between two joint members 4a thus mounted, cover glass frames 30 are fitted in the top portions of the joint members, and beneath the glass frames 30, collector piping 31 is provided for heat collection. A cap 32 is affixed to the lower end (eaves side) of each joint member 4a. Reference numeral 33 represents a ridge member.

As shown in FIG. 5, a plurality of cover glass frames 30 are arranged in telescopic end-to-end connection relationship between the ridge and the eaves and capable of free thermal expansion.

FIG. 6 illustrates a metal roof equipped with a collector embodying the present invention.

Referring to FIG. 7, there is shown a joint member 4a for installing the novel collector. Just like the joint member 4 shown in FIG. 3, the joint member 4a has a generally U-shaped main body 34, but is higher than the former. The joint member 4a includes a pair of flanges 35 projecting sidewise from the main body 34 at the top thereof, a pair of inward projections 36 adapted to engage legs 43 of a cover 37, a pair of channels 38 formed inside the main body 34 to receive means for fastening side portions of cover glass frames 30, and a pair of channels 39 formed outside the main body 34 integrally therewith to support lower portions of cover glass frames 30.

The joint member 4a also includes a pair of downwardly extending sidepieces 40 which are adapted to cover vertical rising portions 10 and 10' of metal roof units 3 and correspond to the downward pieces 16 shown in FIG. 3, a pair of pipe holder mounting channels 41 formed over the downward sidepieces 40, and a pair of cuts 42 for piping which are provided in the main body of the joint member at an end thereof.

FIG. 8 shows a cover 37 to the joint member 4a. The cover has legs 43 adapted to engage the top inside projections 36 of the joint member 4a.

FIG. 9 shows an outermost joint member 4b for collector installation. The cross-sectional construction of the joint member 4b is identical to that of the joint member 4a except that only a single cut 42 for piping is provided in the main body on one side thereof. Although not shown, the outermost joint member on the opposite side is also of the same construction except that a single cut is made on the opposite side.

FIG. 10 shows a cover glass frame 30 to be fitted between the above described joint members. The cover glass frame 30 comprises a pair of longitudinal rails 45, an upper rail 46, a lower rail 47 and glass 48 (two sheets of glass in the illustrated embodiment).

Figure 11:
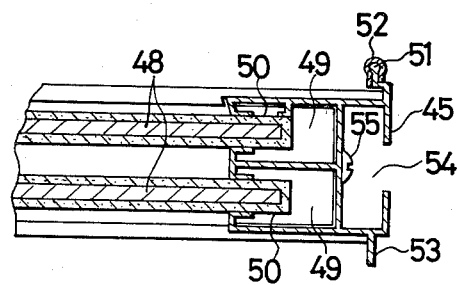
FIG. 11 is a sectional view taken along the line XI—XI of FIG. 10.

FIG. 11 shows one of the longitudinal rails 45, which are symmetrical. The rail 45 is provided inwardly with upper and lower recesses 49, in which the two panes of glass 48 are fitted through packings 50. As will be discussed later (FIGS. 20 and 21), the illustrated double glass construction is not limitative. The longitudinal rail 45 has a projection 51 formed as its uppermost outside portion and fitted with a sealing material 52, and a downwardly extending leg 53 integrally formed as its lowermost outside portion to fit in the supporting channel 39 of the joint member 4a. The longitudinal rail 45 also has a longitudinal groove 54 formed in an intermediate outside portion thereof to receive screws 55 for uniting the longitudinal rail 45 with the upper rail 46 and with the lower rail 47.

Figure 12:
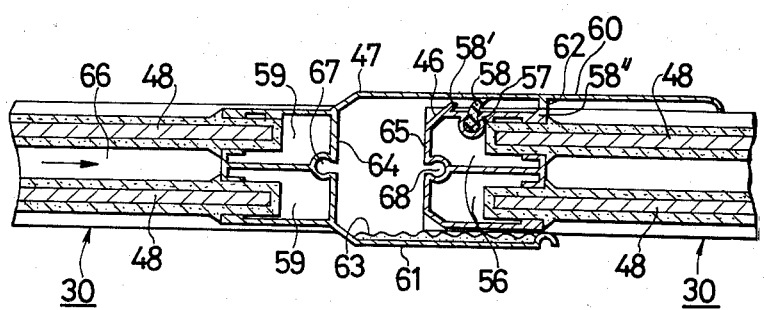
FIG. 12 is a fragmentary sectional view showing upper and lower cover glass frames joined together.

Referring to FIG. 12, the upper rail 46 of a cover glass frame 30 is shown fitted in the lower rail 47 of another cover glass frame 30. The upper rail 46 also has recesses 56, in which two sheets of glass 48 are fitted through seals, and has a groove 57 receiving a seal 58. Drip pieces 58' and 58" are formed on the upper surface of the upper rail. As seen in FIG. 10, the cover glass frame 30 has its upper surface bordered by the projections 51 of the longitudinal rails and the drip pieces 58' and 58" of the upper rail and is therefore perfectly waterproof.

Figure 13:
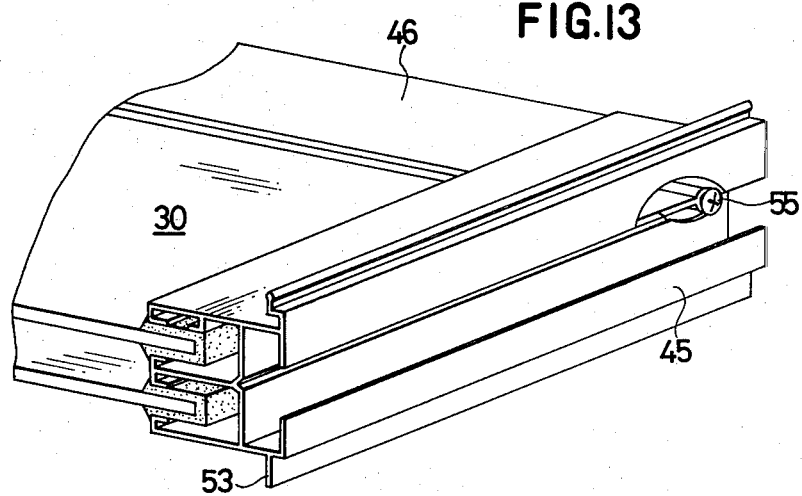
FIG. 13 is a view showing the details of a frame portion indicated by the arrow XIII in FIG. 10.
Figure 14:
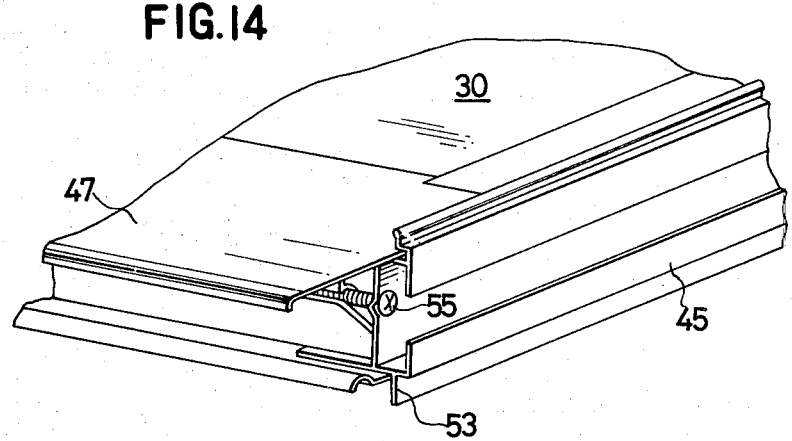
FIG. 14 is a view showing the details of a frame portion indicated by the arrow XIV in FIG. 10.

The lower rail 47 has a pair of glass fitting recesses 59 formed in the inside thereof, and also has an outside portion comprising an upper plate 60 and a lower plate 61, between which there is fitted the upper rail 46 of the mating cover glass frame 30. The upper plate 60 extends beyond the outer end of the lower plate 61, thus covering the lower cover glass frame 30 to prevent the intrusion of rail water. The upper plate 60 has a drip piece 62 integrally formed on the lower surface thereof, and the lower plate 61 has a sealing material 63 bonded on the upper surface thereof. Transverse grooves 67 and 68 are formed in the lower and upper rails 47 and 46 respectively and, in opposed ends thereof, receive screws 55 for connection of both rails with the longitudinal rails 45 as shown in FIGS. 13 and 14.

Referring again to FIG. 12, the upper and lower cover glass frames 30 are coupled so as to provide a spacing between a base 64 of the lower rail 47 and the upper end 65 of the upper rail 46, thus ensuring unhindered thermal growth of the cover glass frames 30 in the direction of arrow 66.

Figure 15:
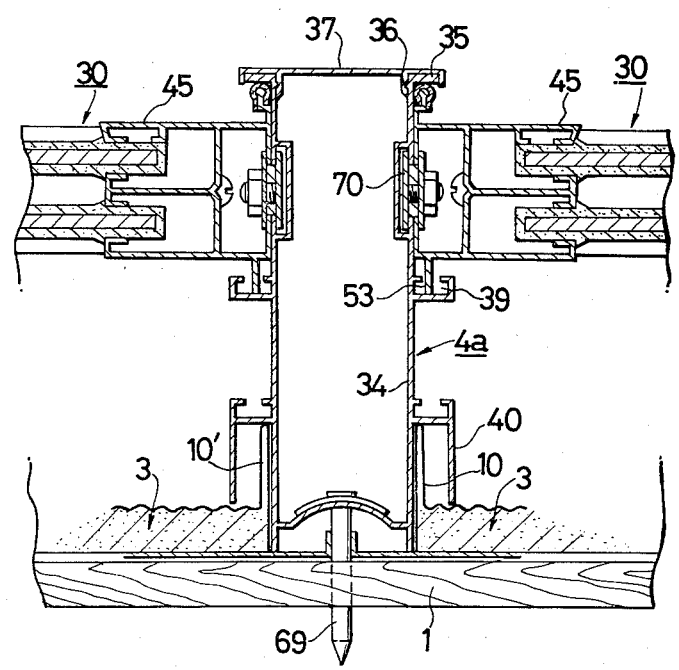
FIG. 15 is a sectional view taken along the line XV of FIG. 4, showing how to retain cover glass frames in position by a joint member.

Reference is now made to FIG. 15. As shown, the main body 34 of the joint member 4a is mounted between vertical rising portions 10 and 10' of metal roof units 3, with the downward sidepieces 40 covering the vertical rising portions. The joint member 4a is fastened to the rafter 1 by nails 69.

In order to set a cover glass frame 30 between two adjacent joint members 4a thus fixed, the downward bottom legs 53 of the opposed longitudinal rails 45 are fitted into the supporting channels 39 from the ridge side and are slid down to an adequate position, where fasteners 70 are tightened to fasten the longitudinal rails 45 to the joint members 4a as shown in FIG. 15.

After a cover glass frame 30 is fastened as the lowermost one, a second cover glass frame 30 is likewise inserted between the joint member 4a from the ridge side down to the position where, as described in conjunction with FIG. 12, the base 64 of the lower rail 47 of the subsequently inserted cover glass frame 30 is spaced as required from the top end 65 of the upper rail 46 of the fixed lowermost cover glass frame 30. Thereafter, the longitudinal rails 45 on both sides are fastened near their respective upper ends to the joint member by fasteners 70.

Figure 16:
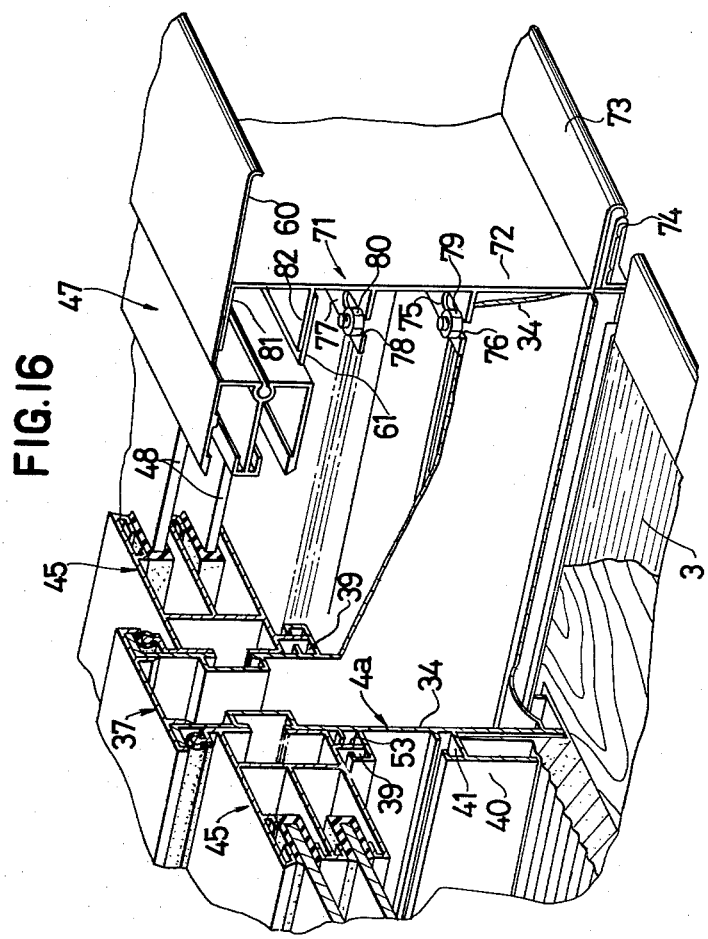
FIG. 16 is a view showing the details of a collector eaves portion indicated by the arrow XVI in FIG. 4.

Referring to FIG. 16, there is shown an eaves construction including an eaves shaped material 71 which has a vertical main portion 72 formed with a U-shaped overhanging portion 73 extending forward from the bottom of the main portion 72 at right angles thereto and so shaped as to cover an eaves member 74 of the metal roof unit 3. On the inside (opposite side to the overhanging portion 73) of the vertical main body 72, two steps 75 and 77 extend from the main body at right angles thereto. The step 75 has a pair of cuts 76 in opposite ends thereof. Likewise, the step 77 has a pair of end cuts 78. On each side of the steps 75 and 77, which extend between joint members 4a, the cuts 76 and 78 receive fasteners 79 and 80 for fastening the eaves material 71 to the pipe holder mounting channel 41 of the joint member 4a and to the frame leg supporting channel 39 of the joint member, respectively. The vertical main body 72 is also provided inwardly thereof with flanges 81 and 82 extending from the main body above the steps 75 and 77 in parallel therewith. The flanges 81 and 82 are fitted between the upper plates 60 and lower plate 61 of the lower rail 47 of the lowermost cover glass frame 30, thus holding the glass frame at its lower end.

Figure 17:
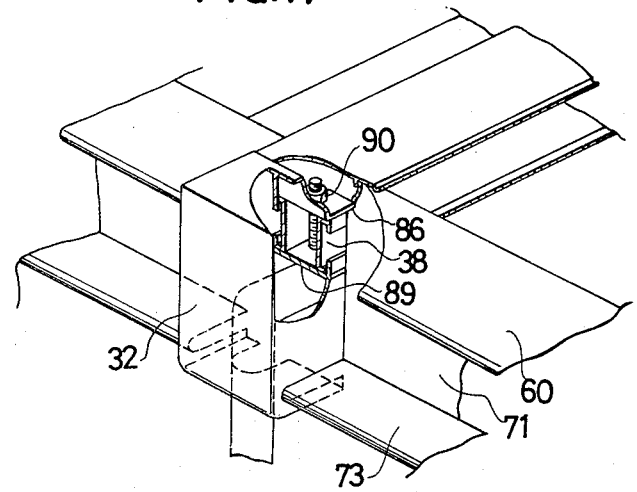
FIG. 17 shows how to fit a cap to a joint member.
Figure 18:
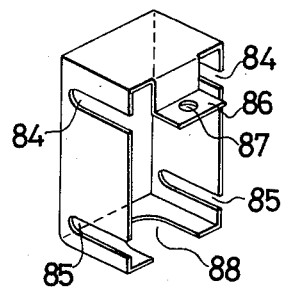
FIG. 18 shows the details of the cap.

FIG. 17 shows the construction of the eaves portion of the joint member 4a. The eaves portion is fitted with a box-shaped cap 32. The cap has a pair of side plates, as shown in FIG. 18, each having cuts 84 and 85 adapted to fit on the upper plate 60 of the lower rail 47 of the lowermost cover glass frame 30 on the corresponding side and the overhanging portion 73 of the eaves material 71, respectively. The cap 32 also has a mounting piece 86 formed at the rear and having a bolt passing hole 87, and has a bottom cut 88 for vertical pipe fitting. As shown in FIG. 17, after the cuts 84 and 85 on each side are fitted on the upper plate 60 of the lower rail 47 and the overhanging portions 73, the cap 32 is fixed by tightening a bolt 90 extending across a plate 89 provided under the frame fastener receiving channels 38 of the joint member 4a and across the mounting piece 86 of the cap.

Figure 19:
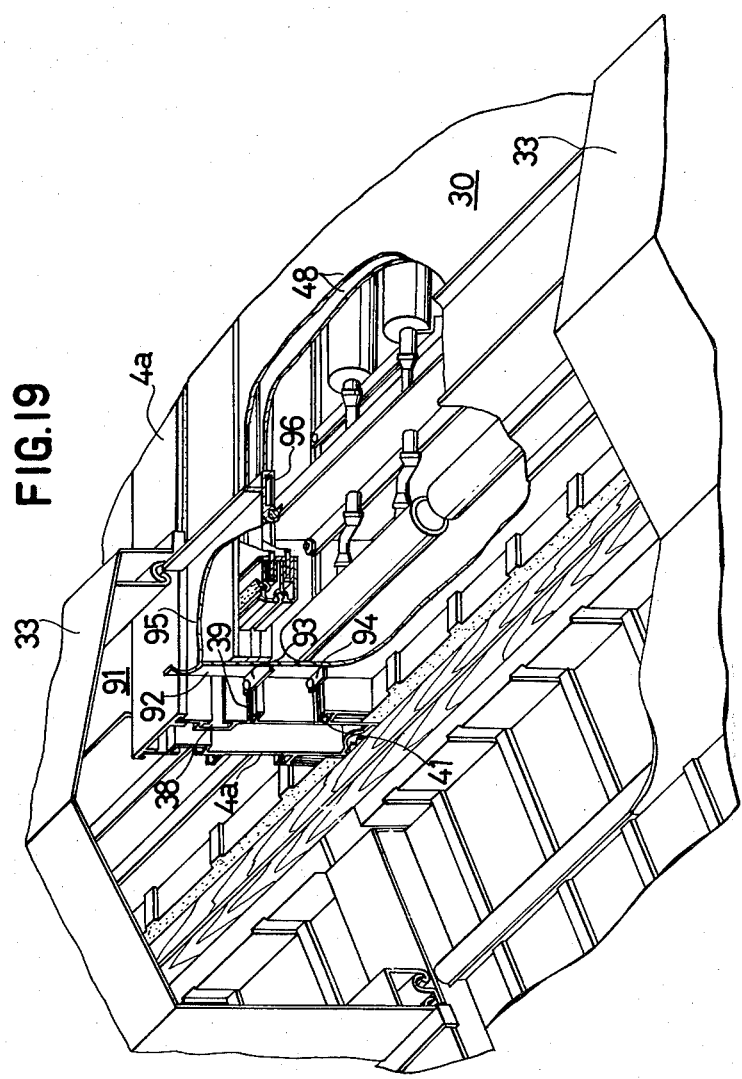
FIG. 19 shows the construction of the ridge portion of a collector.

FIG. 19 shows a ridge construction. A ridge drip member 91 has a vertical main body 92 and two mounting steps 93 and 94 formed integrally therewith. The mounting step 93 is fastened, at opposed sides thereof, to the frame leg supporting channels 39 of adjacent joint members 4a. Likewise, the step 94 is secured to the pipe holder fitting channels 41 of the joint members. The vertical main body 92 is formed integrally with a covering portion 95 which overhangs the cover glass frame 30 in such a manner that a sealing material 96 attached to the lower surface of the covering portion 95 is in contact with the upper surface of the cover glass frame 30 and thus prevents the entry of rain water. A ridge member 33 is affixed to the top of the joint member 4a by making use of a mounting construction which has already been disclosed by the present applicant.

As will be understood from the foregoing description, between each adjacent pair of joint members 4a, a box-shaped space is completely partitioned off by a plurality of cover glass frames 30 on the top side, a metal roof unit 3 on the bottom side, a ridge drip member 91 on the ridge side, and an eaves material 71 on the eaves side.

Piping 31 (FIG. 4) for sun heat absorption is provided within the box-shaped spaces thus defined, and the space between the side walls of the main body of each joint member is also utilized for water conduit arrangement. In this way, a sun heat collector complete with a roof is provided.

The piping 31 can be firmly laid by fastening pipe holding members 98, 99 and 100 (FIGS. 4 and 5), using the pipe holder fitting channels 41 and frame leg supporting channels 39 of each joint member 4a, which are formed on both sides of the main body thereof as described before.

Furthermore, the surface metal plate 5 of the metal roof unit 3 serves for reflection of sun light, while the heat insulating material 8 prevents loss of heat, so that the collector has the advantage of being highly effective for sun heat collection.

Figure 20:
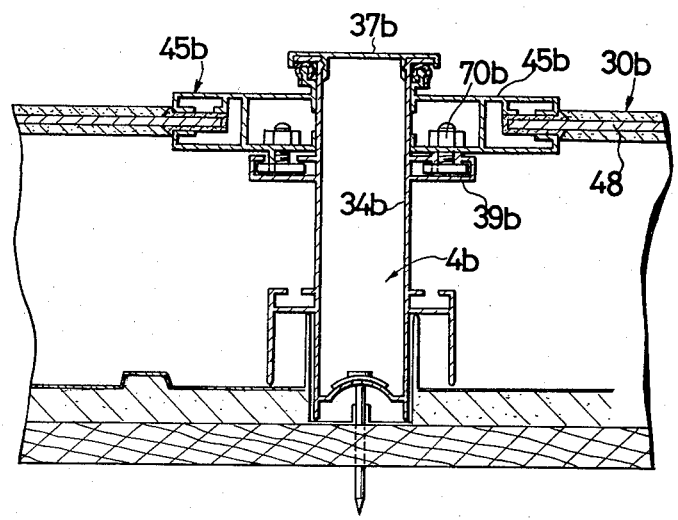
FIG. 20 illustrates a modified joint member and modified cover glass frames connected thereto.

FIG. 20 shows another embodiment of this invention. In this example, cover glass frames 30b, each having a single pane of glass 48, are joined together by a joint member 4b which includes a main body 34b having a pair of support channels 39b formed integrally with opposed side walls thereof. Each support channel 39b receives a fastener 70b adapted to fasten a longitudinal rail 45b of one of the cover glass frames 30b to the support channel. The longitudinal rail 45b is thus fastened downward only, not sidewise, so that the rail is less firmly attached to the main body 34b of the joint member 4b, allowing easier fitting of legs 43b of a cover 37b at the time of assembly.

Figure 21:
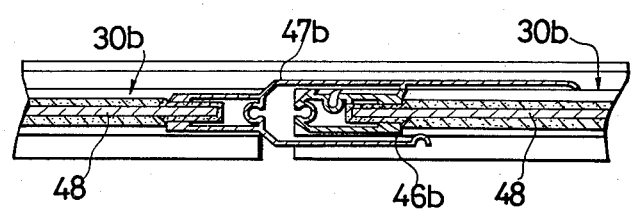
FIG. 21 depicts how to join cover glass frames.

FIG. 21 illustrates coupled upper and lower rails 46b and 47b, respectively, of cover glass frames 30b. Just as in the first embodiment, the upper rail 46b is slidably connected to the lower rail 47b.

The following describes another solar roof embodying the present invention, which includes cover glass frames incorporating structural improvements in respect to fitting, flashing, etc.

Referring to FIGS. 22 and 23, there is shown a metal roof unit 101 associated with the second embodiment. The general construction of the metal roof unit 101, to which the modified collector is to be attached, is basically identical to that of the preceding embodiment. The metal roof unit 101 has a surface metal plate 104. On one side of the metal plate 104, the plate is bent so as to form a vertical rising portion 109 having a horizontal top portion 110, and a sideward connecting extension 111 having a short rising portion 112 at the outside edge thereof. The vertical rising portion 109 has an outside portion extending downwardly from the horizontal portion 110 and the terminates in an upper flat portion of the connecting extension 111, forming a right angle therewith. The extension 111 also has a lower flat portion extending inwardly from the short rising portion 112. On the opposite side of the metal plate 104, it is bent in a similar manner to form a vertical rising portion 109' having a horizontal top portion 110' and a connecting extension 111' having a short rising extreme portion 112'. Opposite side edge portions of a backing material 108 are respectively sandwiched between the upper and lower flat portions of the connecting extension 111 and between those of the extension 111'. As shown, a heat insulating material 107, which is sandwiched between the metal plate 104 and the backing material 108, also fills up the upward rising portions 109 and 109', so that the metal roof unit 101 is capable of satisfactory heat insulation at both sides as well as at the bottom. The reference numeral 113 stands for an eaves member.

Adjacent metal roof units 101 thus constructed are joined together by a joint member 102 as shown in FIG. 24. Joint member 102 has a generally U-shaped main body 115, a pair of support channels 116 projecting sideways from the main body 115 in the middle thereof at right angles thereto to support lower portions of longitudinal rails 131 which are components of cover glass frames 127, and a pair of support portions 117 integrally formed over the support channels 116 to support outside legs 139' of the longitudinal rails 131.

The main body 115 has a pair of inward projections 118 formed near the top thereof to engage legs 125 of a cover 124. The joint member 102 also has a pair of sidepieces 119 extending downwardly from the bottoms of the support channels 116 so as to cover vertical rising portions 109 and 109' of metal roof units 101, and the lower end of each downwardly extending sidepiece 119 is in light contact with the upper surface of the metal roof unit 101 when the joint member is installed on the roof.

The downwardly extending sidepieces 119 are each formed outwardly thereof with a channel 120 for fitting pipe holders of the collector 103. The main body 115 has a bottom 121 formed integrally with a pair of parallel legs 122 extending downwardly therefrom beyond the outside lower ends 123 of the main body 115. When the metal roof units 101 are united together, the connecting extensions 111 and 111' of the roof units 101 are each interposed between leg 122 and outside lower end 23, so that when the roof units 101 are heated to high temperatures, the resultant expansion thereof does not cause overstrain in the joint area. The numeral 124 refers to a cover to the joint member 102. The cover 124 has a pair of legs 125 adapted to engage the top inside projections 118 of the main body 115 of joint member 102. The cover 124 also has a pair of sidepieces 126 extending downward from its lower surface just inwardly of its opposite edges.

FIG. 25 shows an outermost joint member 102a for collector installation. The half of the joint member 102a on one side is identical to that of the intermediate joint member 102. On the other side, however, only a downwardly extending sidepiece 119a is provided. FIG. 26 shows a cover 124a to be fitted to the top of the joint member shown in FIG. 25. The construction of the outermost joint member and cover on the opposite side is symmetrical to that of the joint member 102a and cover 124a.

Figure 27:
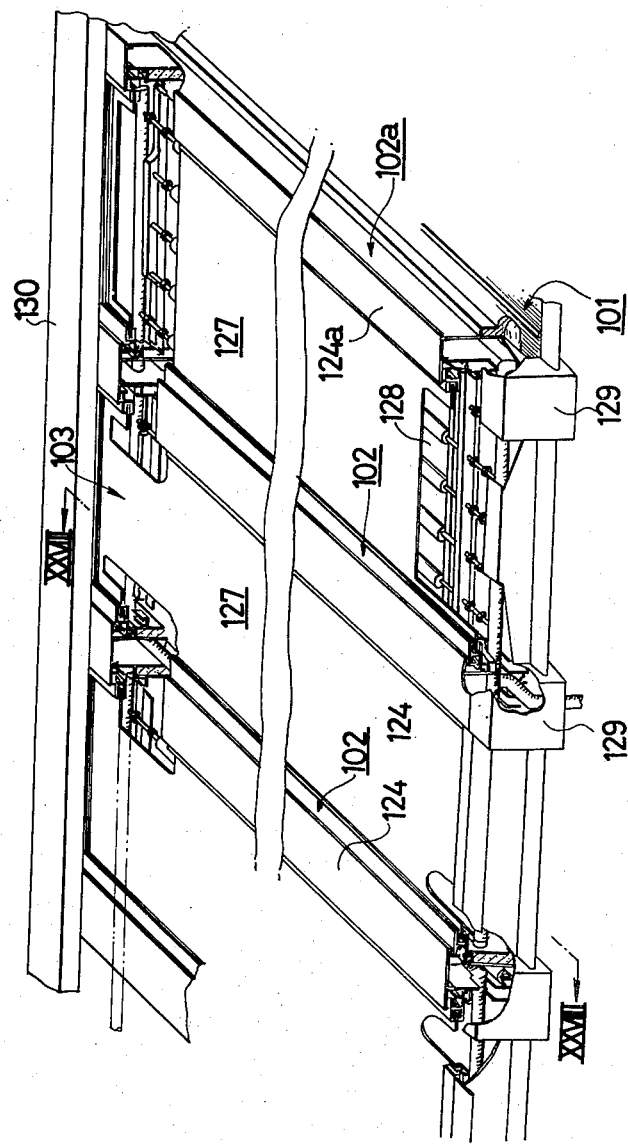
FIG. 27 is a perspective view, partly broken, away, showing a collector.

FIG. 27 shows the collector 103 installed by making use of the novel joint members 102 and 102a of the above described construction. More particularly, between two joint members 102 and member 102 and 102', cover glass frames 127 are fitted in the top portions of the joint members, and beneath the glass frames 127, collector piping 128 is provided for heat collection. Piping is also provided within the joint members 102. A cap 129 is affixed to the lower end (eaves side) of each joint member. Reference numeral 130 represents a ridge member.

Figure 28:
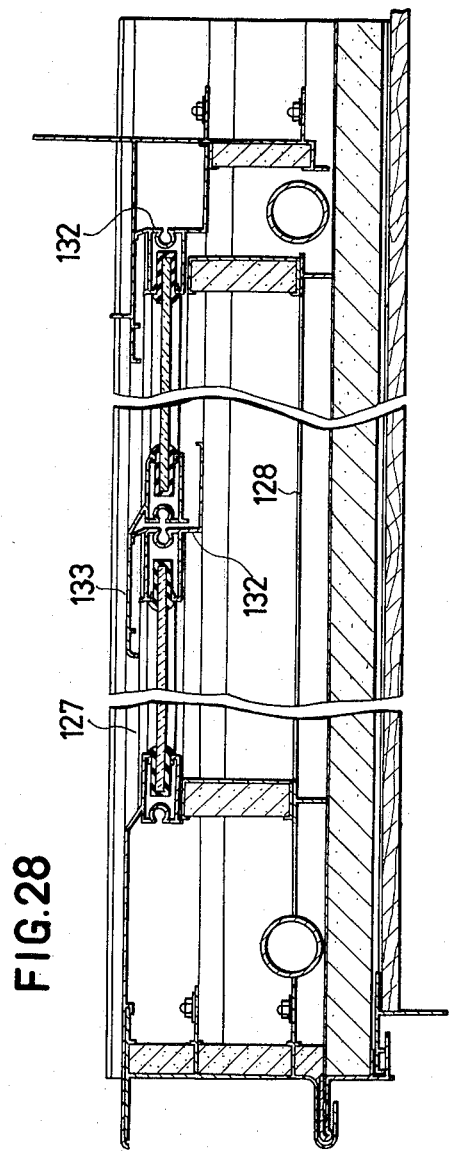
FIG. 28 is a sectional view taken along the line XXVIII—XXVIII of FIG. 27.

As shown in FIG. 28, a plurality of cover glass frames 127 are joined together in alignment between the ridge (at right in the figure) and the eaves, with a predetermined end-to-end spacing at each joint.

FIG. 29 shows the details of a cover glass frame 127 to be fitted between the joint members 102. The cover glass frame 127 comprises a pair of longitudinal rails 131, an upper rail 132, a lower rail 133 and a pane of glass 134 framed by the four rails.

FIG. 30 shows one of the longitudinal rails 131, which includes a recess 136 formed inside to receive a side edge of the glass plate 134 with a packing 135 (FIG. 24) interposed therebetween. The longitudinal rail 131 has an upper surface formed with a drip projection 137 for supporting the cover 124 near the edge on the corresponding side, and a lower portion including both a downwardly extending leg 138 adapted to be received by the supporting channel 116 of the joint member 102 and a flange 139 having an outside leg 139' adapted to rest on the support portion 117 of the joint member. The longitudinal rail 45 also has a longitudinal groove 140 centered in an outside portion thereof to receive screws 141 (FIG. 29) for uniting the longitudinal rail 131 with the upper rail 132 and with the lower rail 133, and upper and lower internal grooves 140a and 140b respectively.

The upper rail 132 (FIG. 31) has a transverse recess 142 formed inside, in which the upper edge of the glass plate 134 is to be inserted with the interposition of the packing. The upper rail 132 also has a upper surface formed with a drip projection 143, and flange 146 extending outward (toward the ridge) as its lowermost integral portion and having an upward drip projection 145 formed along the length of the flange and a downward projection 144 on each side.

The lower rail 133 (FIG. 32) has a transverse recess 147 formed inside to receive the lower edge of the glass 134. The lower rail 133 includes an upper surface formed with a flange 150 which has both a downward projection 148 formed along the length thereof and a rising portion 149 on each side.

The lower rail 133 also has a hollow main body formed with a plurality of water drain holes 151 so that, should rain water enter the glass receiving recess 147, the water could flow out through the holes 151 onto the flange 146 of the upper rail 132.

Figure 33:
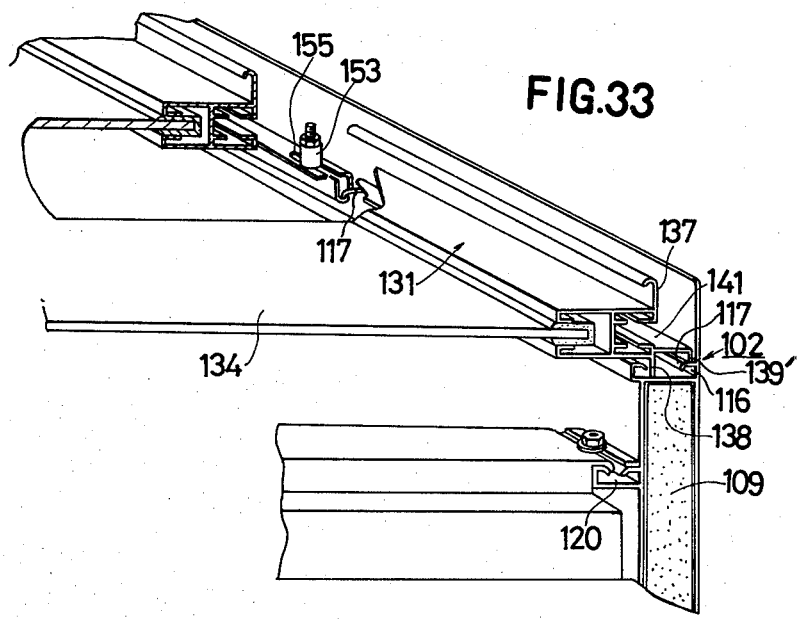
FIG. 33 is a perspective view depicting how to fasten a cover glass member to a joint member.
Figure 34:
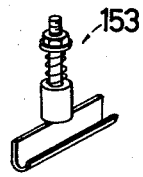
FIG. 34 is a perspective view of a fastener.

The upper rail 132, lower rail 133 and longitudinal rails 131 thus constructed are assembled as shown in FIG. 29, and between joint members 102, a plurality of cover glass frames 127 produced in this way are joined one to another in succession, with the eaves-side or lowermost one inserted first, until the joining of the ridge-side or uppermost one is completed. More particularly, as shown in FIG. 33, each cover glass frame 127 can be set between the joint members 102 in a simple manner, merely by placing the downward leg 138 of the longitudinal rail 131 on each side on the bottom of the support channel 116 and the outside leg 139' on the support portion 117. The longitudinal rail 131 can be fastened to the joint member 102 by tightening a fastener 153 (FIG. 34) which has a lower portion in the form of a hook adapted to engage the underside of the outside-leg supporting portion 117 of the joint member 102 and is passed through a slot 155 formed in the flange 139 of the longitudinal rail 131 near the upper end of the longitudinal rail. The fastener 153 is tightened after completion of the positional adjustment now to be described in conjunction with FIG. 35.

Referring to FIG. 35, there is shown a joint construction associated with neighboring upper and lower cover glass frames 127. When the longitudinal rail 131 on each side of the lower cover glass frame 127 is fastened to the upper rail 132 thereof by the fastening bolt 157, an adjusting jig 156 having a fitting portion 158 as shown in FIG. 36 is simultaneously held in the lower groove 140b of the longitudinal rail 131, with the fitting portion 158 supported by the fastening bolt 157. The adjusting jig 156 also has an L-shaped upper end portion 159 adapted to come in contact with the confronting surface of the lower rail 133 of the upper cover glass frame 127, thereby providing an adjustable spacing between the upper and lower cover glass frames.

On the other hand, when the longitudinal rail 131 on each side of the upper cover glass frame 127 is fixed to the lower rail 133 thereof, a jig 160 having a fitting portion 161 as shown in FIG. 37 is held in the upper groove 140a of the longitudinal rail 131, with the fitting portion 161 supported by the fastening bolt 163. The jig 160 has its lower end 162 inserted into the upper groove 140a of the longitudinal rail 131 of the lower cover glass frame 127, thereby preventing perpendicular and transverse shifting of the upper cover glass frame 127.

In this way, between joint members 102, a plurality of cover glass frames 127 are successively set from the eaves side to the ridge side, and each cover glass frame 127 to be joined to the lower one in preset dimensional relationship can be spaced as predetermined from the lower cover glass frame by the presence of the adjusting jigs 156 on both sides.

Furthermore, as described before, the cover glass frame 127 is fastened to the joint members only by the two fasteners 154 near its upper ends on both sides, so that the glass frame is free to expand and shrink in the longitudinal direction. However, its lower portion engages the lower cover glass frame through the jigs 160 on both side and is therefore free from clattering due to wind pressure or the like.

As viewed in FIG. 29, the cover glass frame 127 is a case-like structure having the longitudinal rails 131, upper rail 132 and lower rail 133 as framing members, the longitudinal rails 131 being formed with the drip projections 137 and the upper rail 132, with the drip projection 143. These drip projections serve as watertight walls capable of perfect prevention of the intrusion of rain water. However, if there should occur a water leak, the upper and longitudinal rails, which are made hollow to form through means well suited to discharge water, would conduct the water obliquely downward. In addition, should rain water leak into the lower rail 133, the water would flow through the water drain holes 151 down onto the flange 146 of the upper rail 132 located downward of the lower rail and would then flow down in the sloping support channels of the joint members. Thus, perfect flashing is ensured without using any sealing material between cover glass frame and joint member.

It will be recognized that the above described construction is extremely simple, allowing simplified mounting work, and provides perfect flashing, and that the relative sliding capacity permits free thermal expansion. Thus, the novel heat collecting system is ideal as a collector which is exposed to wind and rain and subjected to high temperatures.

Here follows a description of another improved construction associated with the solar roof of the present invention, which is adapted to provide a further improved heat collecting effect, an enhanced fitting work efficiency, improved flashing, etc. The construction comprises, as basic elements, joint members, cover glass frames and heat collecting equipment, and in a box-shaped space section corresponding to each cover glass frame to be placed at the top thereof, heat insulating walls are installed along the four sides.

Figure 38:
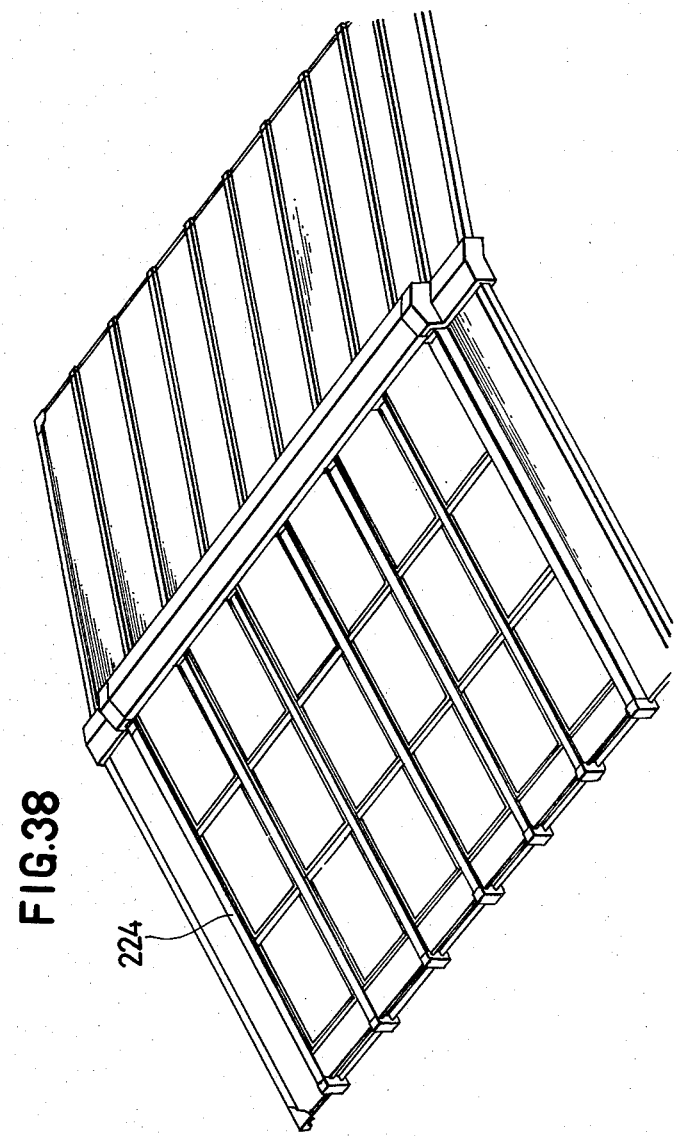
FIG. 38 is a perspective view of a solar energy collecting roof according to the present invention.
Figure 39:
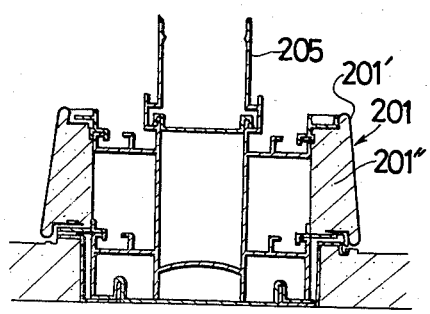
FIGS. 39 through 42 are sectional views of heat insulating walls according to the present invention which serve as longitudinal, ridge-side, eaves-side, and intermediate partitions, respectively.
Figure 40:
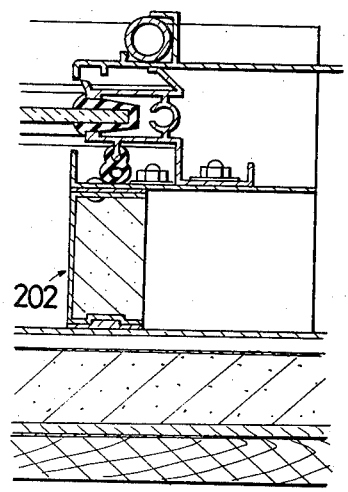
Figure 41:
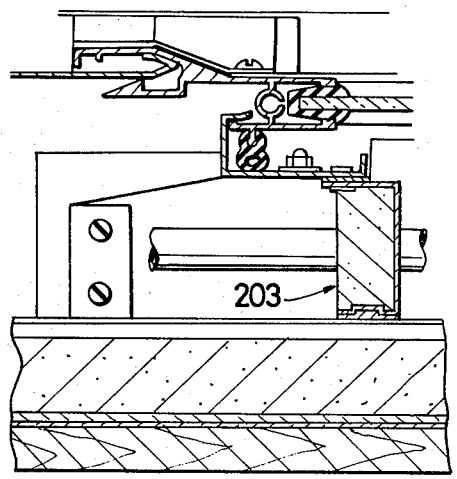
Figure 42:
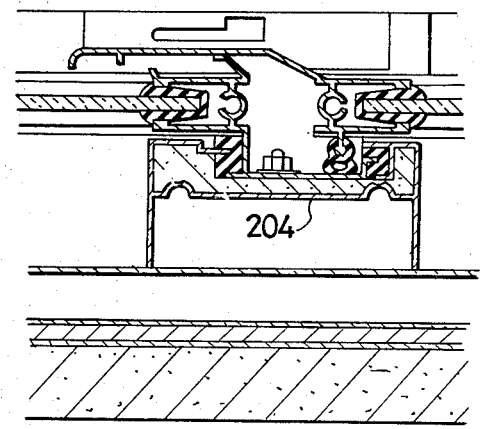

This construction generally includes transverse rails properly located between transversely spaced joint members so as to partition off the box-shaped spaces to be topped by the respective cover glass frames, and opposed parallel longitudinal heat insulating walls and opposed parallel transverse heat insulating walls arranged in each of the box-shaped spaces along the four sides thereof. Each of the longitudinal heat insulating walls is mounted by making use of the upper and lower supporting channels of the joint member which are formed on the side thereof facing the wall, while each of the transverse partition walls are brought into snapping engagement with the upper or lower rail at the associated glass frame joint. More particularly, FIG. 38 is a perspective view of a solar energy collecting roof according to the present invention, and FIG. 39 shows in cross section the configuration of longitudinal heat insulating partition members 201 in mounted position. Similarly, FIGS. 40, 41 and 42 illustrate ridge-side, eaves-side and intermediate transverse heat insulating partition members 202, 203 and 204 respectively.

As shown in FIG. 39, each longitudinal partition member 201 includes an outside plate member 201′ made of aluminum sheet and a heat insulating material 201″ housed in the outside member in firm connection therewith. The longitudinal partition member thus constructed is fitted through fittings to the associated upper and lower side channels of the joint member 205 at the edges of the channels. The ridge side, eaves side, and intermediate heat insulating partition members are, as shown, each constructed of an extruded aluminum shape and a heat insulating material contained within the shaped material. The ridge side partition member 202 and eave side partition member 203 are respectively coupled with the associated upper and lower rails through a heat insulating material.

A cross-sectionnal view of a metal roof unit of this embodiment is shown in FIG. 43.

Figure 44:
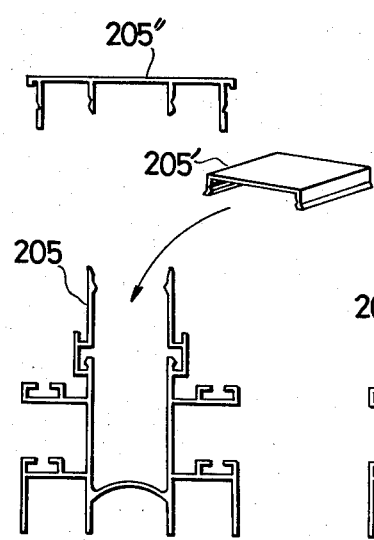
FIG. 44 is a sectional view showing the construction of a joint member according to the embodiment including the partition walls.
Figure 45:
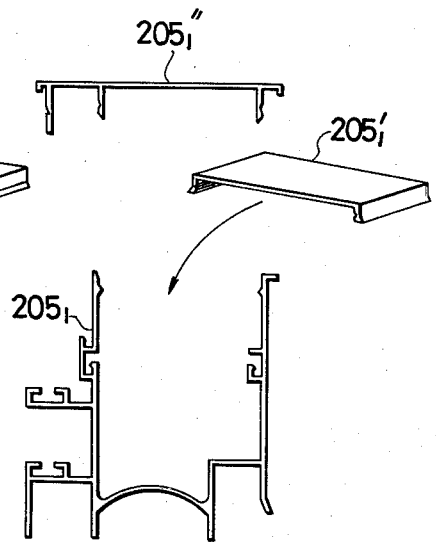
FIG. 45 is a sectional view showing a joint member for use at a collector on the side thereof.

The joint member 205 employed in this embodiment has such a cross-sectional shape as shown in FIG. 44, and basically has a pair of support channels on opposed sides, a pair of support portions respectively located above the support channels, and a cover 205″ just as in the preceding embodiment. However, the configuration is adapted for use with the improved cover glass frames which will be described below. In addition, a connecting member 205′ is fitted between the opposed vertical walls of the joint member to improve the resiliency of the portions of the joint member which exist above the connecting member. FIG. 45 is a joint member for use at a collector on the side thereof. In this drawing, similar parts are designated with similar simbols as in FIG. 44. The configuration and composition of the ridge-side, intermediate and eaves-side cover glass frames which are suited for combination with the above described joint member are basically similar to those in the preceding embodiment, as will be understood by reference to FIGS. 46 through 50, which show a longitudinal rail 206, a ridge side upper rail 217, an intermediate zone lower rail 215, an intermediate zone upper rail 212, and an eaves side lower rail 219. The longitudinal rail 206 has a downwardly extending leg 207, a vertical portion 208, parallel upper and lower horizontal portions connected by the vertical portion, and a rising portion 209 projecting upwardly from the upper horizontal portion. When the longitudinal rail is attached to the joint member, the rising portion 209 stands in parallel with the confronting upper wall portion of the joint member and, in the final step of the fitting work, serves for firm fitting of the cover 205″ of the joint member. In addition, the lower horizontal portion has an extension 210 terminating with a short projection 211 which cooperates with the lower horizontal extension to define a water flow passageway convenient for discharge of dew. The intermediate zone upper rail 212 is similar to that of the foregoing embodiment. However, the rail includes, as its lowermost portion, a horizontal extension toward the ridge side which terminates with a rising portion 214 adapted for attachment of a heat insulating material which is interposed between the rail and the ridge side of the intermediate partition member mounted therebelow, at the joint with the partition member. The intermediate zone lower rail 215 is substantially the same as in the preceding embodiment; however, it has a lower surface formed with a downward projection 216 for attaching a sealing material. The ridge side upper rail 217 also has a downward projection 218 similar to that of the intermediate zone lower rail 215. The eaves side lower rail 219 has an upper portion comprising a flange formed with a downward drip projection, an upper surface 221 formed with an extension including an upwardly facing inclined tip portion 220 opposed to said flange and extending toward the eaves side, and a lower surface formed with a downward projection 222.

Figure 52:
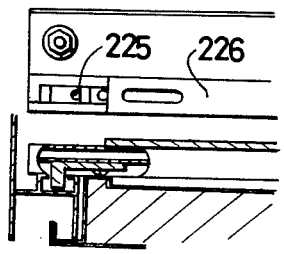
FIGS. 51A and 51B and 52 are respectively a front view and a plan depicting how to mount a transverse rail.
Figure 51A:
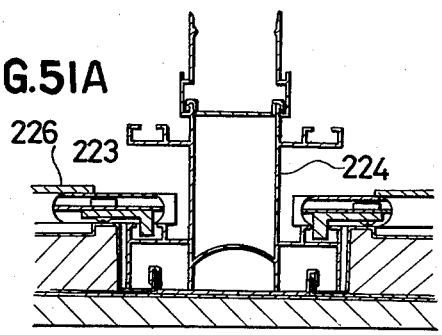
Figure 51B:
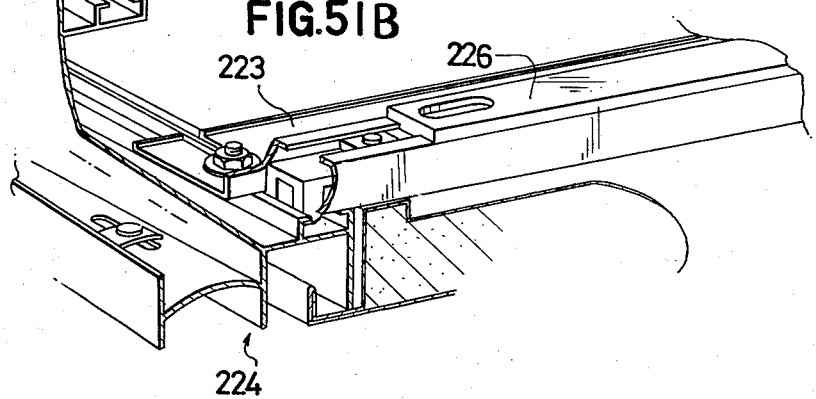

After a number of joint members are firmly arranged on laid metallic heat-insulating roof units in accordance with a predetermined process, a required number of transverse rail, one of which is shown at 223 in FIG. 51, are mounted between each adjacent pair of joint members, one shown at 224 in FIG. 51, by utilizing the associated outside lower support channels of the joint members, the transverse rails being positioned one at each cover glass frame joint. In order to prevent the transverse rails and related members from excessive thermal strain, the transverse rails are so constructed as to be movable longitudinally thereof as shown at 225 in FIG. 52. These transverse rails serve as support members for heat collecting equipment contained in the box-shaped space extending between the adjacent joint members from the eases area to the ridge. Between each transverse rail and the heat collecting equipment there is interposed a heat insulating material 226 to prevent escape of collected heat. Thus, the adjacent joint members and the transverse rails perpendicular thereto form a ladder-like framework over the associated roof unit.

Figure 54:
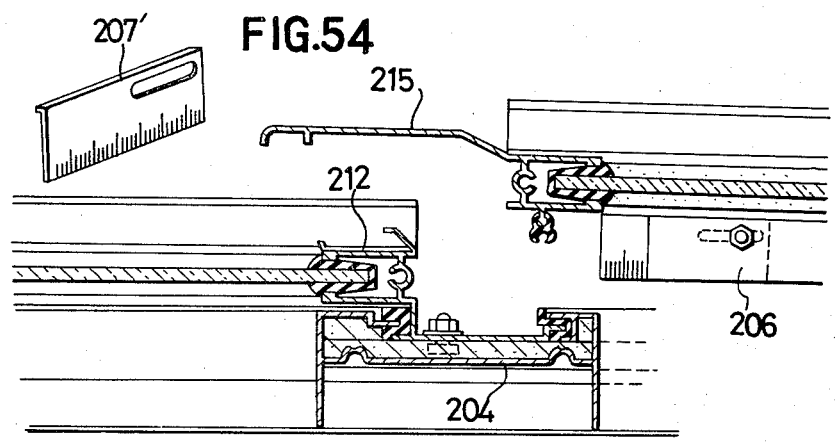
FIGS. 54, 55 and 56 are sectional and perspective views showing how to join upper and lower rails.
Figure 55:
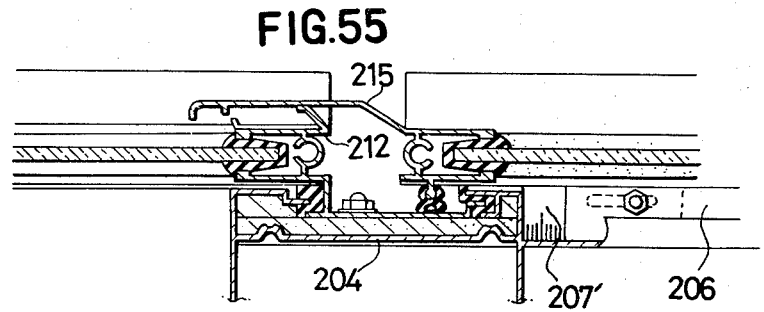
Figure 56:
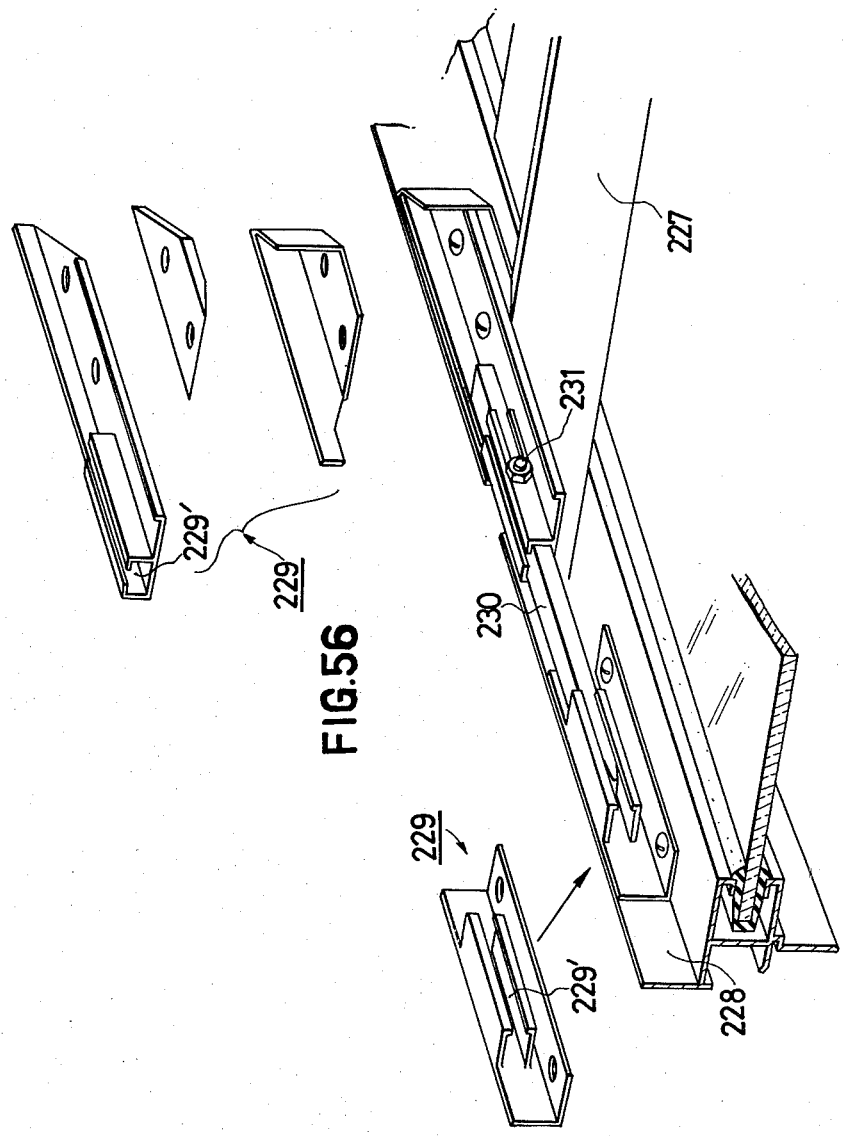
Figure 57:
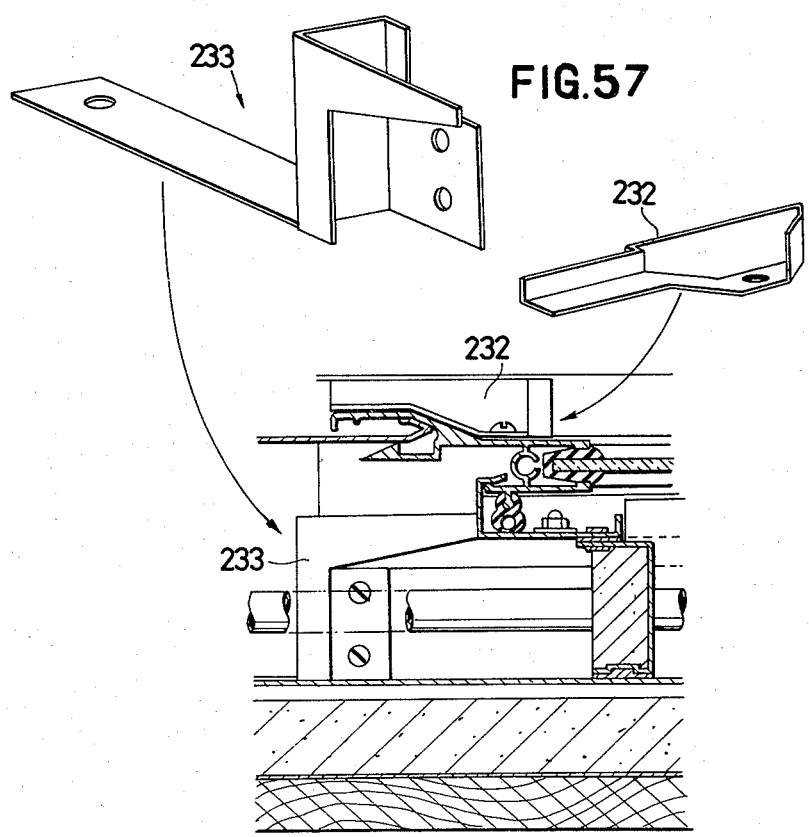
FIG. 57 is a view illustrating a positioning and connecting method for an eaves side lower rail.

As shown in section in FIG. 53, the longitudinal rail 206 is fitted to the joint member 224 only inserting the downwardly projecting leg 207 of the longitudinal rail into the associated upper support channel of the joint member, and the longitudinal rail is not fastened to the joint member as in the preceding embodiment. Each neighboring pair of cover glass frames, after positioned as predetermined between adjacent joint members, are connected to each other in the manner shown in FIGS. 54 and 55 that is, the upper rail 215 and the lower rail 212 each of which are shown in separated state in FIG. 54, are jointed slidably as shown in FIG. 55, wherein a positioning plate 207' is preset on the downwardly extending leg 207 of the longitudinal rail 206 before the upper and lower rails are assembled, thereafter the leading edge of the positioning plate 207' is abutted against the rear (ridge-side) surface of the intermediate transverse heat insulating partition member 204, and wherein the numerals 227 and 228 refer to the lower rail of the upper cover glass frame and one of the longitudinal rails of the lower glass frame, respectively. The upper rail of the lower glass frame hides under the upper glass frame. Means, generally represented by 229, are provided on each side of the glass frame assembly to form a channel system adapted to set a bar 230 for connection between the upper and lower rails. The channel means 229 include two channels, both designated 229', which are separately fixed as shown in longitudinal alignment with each other. The bar 230 is inserted in the channels 229' thus aligned and is fastened, in a predetermined position, to one of the channels by means of a bolt 231. In the eaves area, as seen in FIG. 57, a stepped metal member 232 is used for rail connection. The reference numeral 233 denotes a metal member for positioning the lower rail of the lowermost glass frame.

Figure 58:
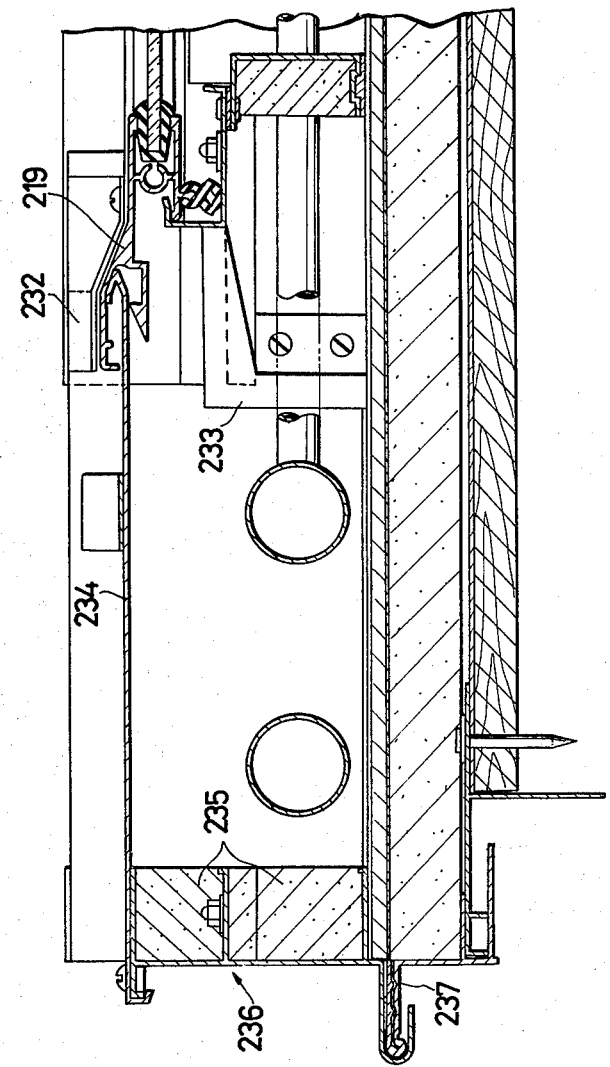
FIG. 58 is an assembly drawing showing the construction of an eaves section.

The eaves construction in this illustrative structural system is as shown in FIG. 58. The eaves zone lower rail 219, a forwardly extending covering member 234 adapted for waterproof connection, an eaves shaped material 236 containing a heat insulating material 235, and an eaves member 237 affixed to the main body of the roof are connected together in a simple and positive manner.

Figure 59:
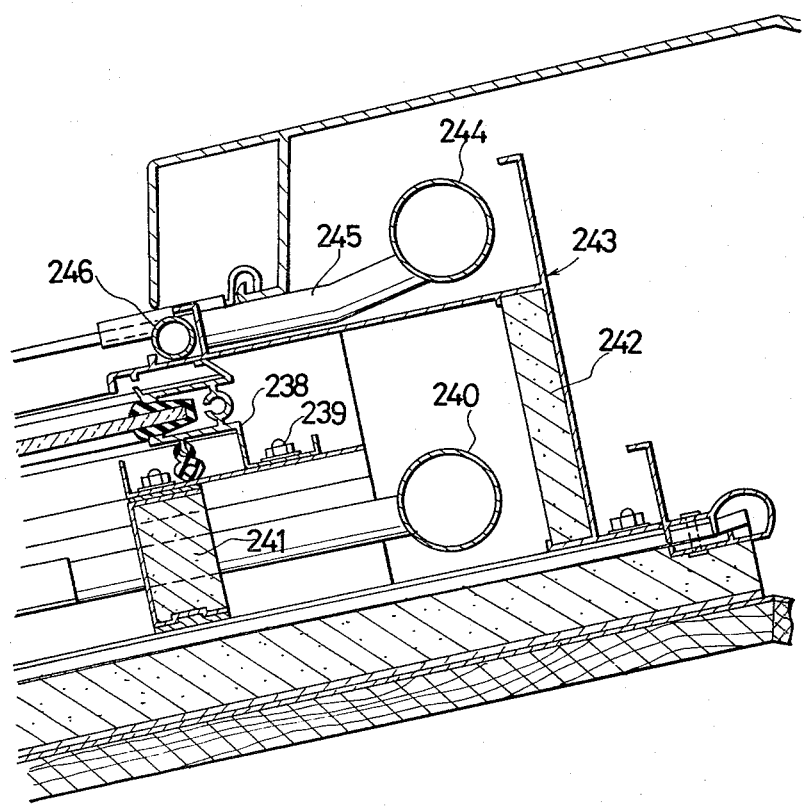
FIG. 59 is an assembly drawing showing the construction of a ridge section.

According to the present exemplary construction, assembling in the ridge zone is generally performed in the same manner as for the ridge construction described hereinbefore, as schematically illustrated in FIG. 59. Moreover, the upper rail 238 of the ridge side cover glass frame is connected to the joint members by means of bolts 239 as shown, and hot water piping 240 is disposed in a section bounded by both a ridge side heat insulating partition member 241 and a ridge member 243 encasing a heat insulating material 242.

Figure 60:
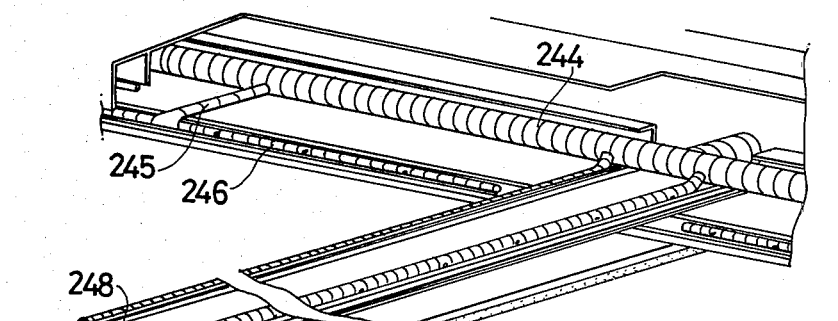
FIG. 60 is a perspective view of one embodiment of a washing means applied to the solar roof according to the present invention.
Figure 61:
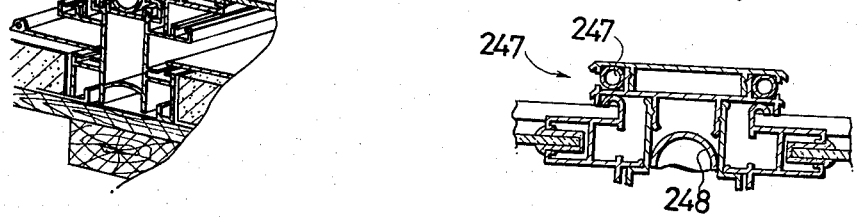
FIG. 61 is an enlarged sectional view of a part of the joint member for use in FIG. 60's means.

FIG. 59 also shows a conduit 244, a communication pipe 245 and a sprinkling porous pipe 246 which are located up in the ridge area and constitute elements of a washing and sprinkling system for the collector. The conduit can be supplied with cleaning water as from a water supply duct extending from the eaves through a selected joint member along the length thereof as seen from an example of the washing system shown in FIGS. 60 and 61, wherein 246 and 247 are horizontal and vertical sprinkling conduits respectively.

What is claimed is:

1. A solar energy collecting roof comprising metal roof units capable of heat insulating, extrusion-molded joint members for joining said metal roof units, cover glass frames fitted between each adjacent pair of said joint members, and heat collecting piping provided in box-shaped spaces defined by the metal roof units, the joint members and the cover glass frames, said solar energy collecting roof being characterized in that each of said cover glass frames comprises an upper rail which has an upper surface provided with a drip projection and also has an outwardly extending lowermost portion comprising a flange formed with an upward drip projection; a lower rail which has an upper portion comprising a flange formed with a downward projection; a pair of longitudinal rails each of which has an upper portion including a drip projection and also has a lower portion including both a downwardly extending leg and an outside leg; and glass framed by said upper, lower and longitudinal rails.

2. A solar energy collecting roof as set forth in claim 1, characterized in that said cover glass frames fitted between each adjacent pair of said joint members are connected to each other so as to be relatively slidable and waterproof.

3. A solar energy collecting roof comprising metal roof units capable of heat insulating, extrusion-molded joint members for joining said metal roof units, cover glass frames fitted between each adjacent pair of said joint members, and heat collecting piping provided in box-shaped spaces defined by the metal roof units, the joint members and the cover glass frames, said solar energy collecting roof being characterized in that each of said cover glass frames comprises an upper rail which has an upper surface provided with a drip projection and also has an outwardly extending lowermost portion comprising a flange formed with an upward drip projection; a lower rail which has an upper portion comprising a flange formed with a downward projection; a pair of longitudinal rails each of which has an upper portion including a drip projection and also has a lower portion including both a downwardly extending leg and an outside leg; and glass framed by said upper, lower and longitudinal rails; each of said joint members having a pair of support channels respectively formed on opposite sides thereof and a pair of support portions respectively formed over said support channels, said downwardly extending leg of each said longitudinal rail being received by one of said support channels of the mating joint member, said outside leg of each said longitudinal rail being mounted on one of said support portions of the mating joint member, each said longitudinal rail being fastened near the upper end thereof to the mating joint member.

4. A solar energy collecting roof as set forth in claim 3, characterized in that said cover glass frames fitted between each adjacent pair of said joint members are connected to each other so as to be relatively slidable and waterproof.

5. A solar energy collecting roof characterized by metal roof units capable of heat insulation, extrusion-molded joint members for joining said metal roof units, cover glass frames fitted between each adjacent pair of said joint members, and heat collecting piping provided in box-shaped spaces defined by the metal roof units, the joint members and the cover glass frames, said energy collecting roof being further characterized in that each of said cover glass frames comprises an upper rail which has an upper surface provided with a drip projection and also has an outwardly extending lowermost portion comprising a flange formed with an upward drip projection; a lower rail which has an upper portion comprising a flange formed with a downward projection; a pair of longitudinal rails each of which has an upper portion including a drip projection and also has a lower portion including both a downwardly extending leg and an outside leg; and glass framed by said upper, lower and longitudinal rails; each of said joint members having a pair of support channels respectively formed on opposite sides thereof and a pair of support portions respectively formed over said support channels, said downwardly extending leg of each said longitudinal rail being received by one of said support channels of the mating joint member, said outside leg of each said longitudinal rail being mounted on one of said support portions of the mating joint member, each said longitudinal rail being fastened near the upper end thereof to the mating joint member, said energy collecting roof being still further characterized in that said cover glass frames fitted between each adjacent pair of said joint members comprise a ridge side cover glass frame, an eaves side cover glass frame and at least one intermediate cover glass frame, all of which are inserted in due succession between the adjacent joint members from the eaves side to the ridge side to be combined together, each adjacent pair of the cover glass frames thus combined being coupled in such a manner that an adjustable spacing is provided therebetween by adjusters attached to the longitudinal rails of the lower one of the adjacent cover glass frames, while by jigs attached to the longitudinal rails of the upper cover glass frame, the upper and lower cover glass frames are coupled so as to be relatively slidable and neither perpendicularly nor transversely shiftable.

6. A solar energy collecting roof as set forth in claim 5, characterized in that said cover glass frames fitted between each adjacent pair of said joint members are connected to each other so as to be relatively slidable and waterproof.

7. A solar energy collecting roof characterized by metal roof units capable of heat insulation, extrusion-molded joint members for joining said metal roof units, cover glass frames fitted between each adjacent pair of said joint members, and heat collecting piping provided in box-shaped spaces defined by the metal roof units, the joint members and the cover glass frames; said cover glass frames fitted between each adjacent pair of said joint members comprising a ridge side cover glass frame, at least one intermediate cover glass frame and an eaves side cover glass frame; said ridge side cover glass frame comprising a ridge side upper rail, an intermediate zone lower rail, a pair of longitudinal rails and cover glass, said intermediate cover glass frame comprising an intermediate zone upper rail, an intermediate zone lower rail, a pair of longitudinal rails and cover glass, said eaves side cover glass frame comprising an intermediate zone upper rail, an eaves side lower rail, a pair of longitudinal rails and cover glass; said ridge side upper rail having an upper surface provided with a drip projection, a lower surface formed with a downward drip projection, and a joining piece extending toward the ridge side in a plane parallel to the lower surface, each of said intermediate zone lower rails having an upper portion comprising a flange formed with a downward projection, and a lower surface formed with a downward projection each of said intermediate zone upper rails being similar to said ridge side upper rail, said eaves side lower rail having an upper portion comprising a flange formed with a downward projection, an upper surface formed with an extension including an upwardly facing inclined tip portion opposed to said flange and extending toward the eaves side, and a lower surface formed with a downward projection, each of said longitudinal rails having an upper portion including a drip projection and a lower portion including both a downwardly extending leg and an outside leg; each of said joint members having a pair of support channels respectively formed on opposite sides thereof and a pair of support portions respectively formed over said support channels, said downwardly extending leg of each said longitudinal rail being received by one of said support channels of the mating joint member, said outside leg of each said longitudinal rail being mounted on one of said support portions of the mating joint member, each said longitudinal rail being fastened near the upper end thereof to the mating joint member; under each said cover glass frame there being heat insulating walls extending along the four sides thereof; said eaves side cover glass frame, said at least one intermediate cover glass frame and said ridge side cover glass frame being successively inserted between the adjacent joint members from the eaves side to the ridge side to be combined together, each adjacent pair of the cover glass frames thus combined being coupled in such a manner that an adjustable spacing is provided therebetween by adjusters attached to the longitudinal rails of the lower one of the adjacent cover glass frames, while by jigs attached to the longitudinal rails of the upper glass frame, the upper and lower cover glass frames are coupled so as to be relatively slidable and neither perpendicularly nor transversely shiftable.

8. A solar energy collecting roof as set forth in claim 7, characterized in that a ridge construction above said ridge side upper rail is provided with cover glass washing means having multiple sprinkling holes and disposed in parallel with the ridge.

9. A solar energy collecting roof as set forth in claim 7, characterized in that said cover glass frames fitted between each adjacent pair of said joint members are connected to each other so as to be relatively slidable and waterproof.

* * * * *